US009248701B2

(12) United States Patent
Calvi

(10) Patent No.: US 9,248,701 B2
(45) Date of Patent: Feb. 2, 2016

(54) VEHICLE WHEEL CHANGING METHOD

(75) Inventor: John Calvi, Moorabbin (AU)

(73) Assignee: Technological Resources Pty. Limited, Melbourne, Victoria (AU)

( * ) Notice: Subject to any disclaimer, the term of this patent is extended or adjusted under 35 U.S.C. 154(b) by 180 days.

(21) Appl. No.: 13/978,201

(22) PCT Filed: Jan. 12, 2012

(86) PCT No.: PCT/AU2012/000020
§ 371 (c)(1),
(2), (4) Date: Jul. 3, 2013

(87) PCT Pub. No.: WO2012/094706
PCT Pub. Date: Jul. 19, 2012

(65) Prior Publication Data
US 2013/0276306 A1    Oct. 24, 2013

(30) Foreign Application Priority Data

Jan. 12, 2011  (AU) ................................ 2011900085
Jan. 12, 2011  (AU) ................................ 2011900086
Jan. 12, 2011  (AU) ................................ 2011900087

(51) Int. Cl.
*B60B 29/00*    (2006.01)
*B60B 23/04*    (2006.01)
*B60B 23/10*    (2006.01)
*B60B 25/20*    (2006.01)

(52) U.S. Cl.
CPC .............. *B60B 29/007* (2013.01); *B60B 23/04* (2013.01); *B60B 23/10* (2013.01); *B60B 25/20* (2013.01); *B60B 29/00* (2013.01); *B60B 29/008* (2013.01); *Y10S 901/01* (2013.01); *Y10S 901/09* (2013.01); *Y10T 29/49492* (2015.01); *Y10T 29/49815* (2015.01); *Y10T 29/49822* (2015.01); *Y10T 29/49826* (2015.01); *Y10T 29/49947* (2015.01); *Y10T 29/49948* (2015.01)

(58) Field of Classification Search
CPC .... B60B 29/007; B60B 29/00; B60B 29/008; B60B 23/10; B60B 25/20; B60B 23/04; Y10T 29/49492; Y10T 29/49826; Y10T 29/49947; Y10T 29/49948; Y10T 29/49815; Y10T 29/49822; Y10S 901/09; Y10S 901/01
See application file for complete search history.

(56) References Cited

U.S. PATENT DOCUMENTS

2006/0288577 A1 * 12/2006 Bormuth ......................... 29/894
2009/0248191 A1    10/2009 Kondo et al.

FOREIGN PATENT DOCUMENTS

DE   102005048377 A1   5/2007
JP       6190661 A      7/1994

OTHER PUBLICATIONS

International Search Report mailed Mar. 28, 2012 (PCT/AU2012/000020); ISA/AU.

* cited by examiner

*Primary Examiner* — John C Hong
(74) *Attorney, Agent, or Firm* — Banner & Witcoff, Ltd.

(57) ABSTRACT

A method for changing a vehicle wheel held to the vehicle by nuts and retainer cleats comprising: using a mobile robot for removal and replacement of the wheel nuts and retainer cleats in combination with the use of a mobile mechanical wheel handler to grip and remove the wheel and to bring a replacement wheel into position before replacement of the wheel nuts and cleats by the robot.

20 Claims, 26 Drawing Sheets

Ducking under Wheel Handler Arms

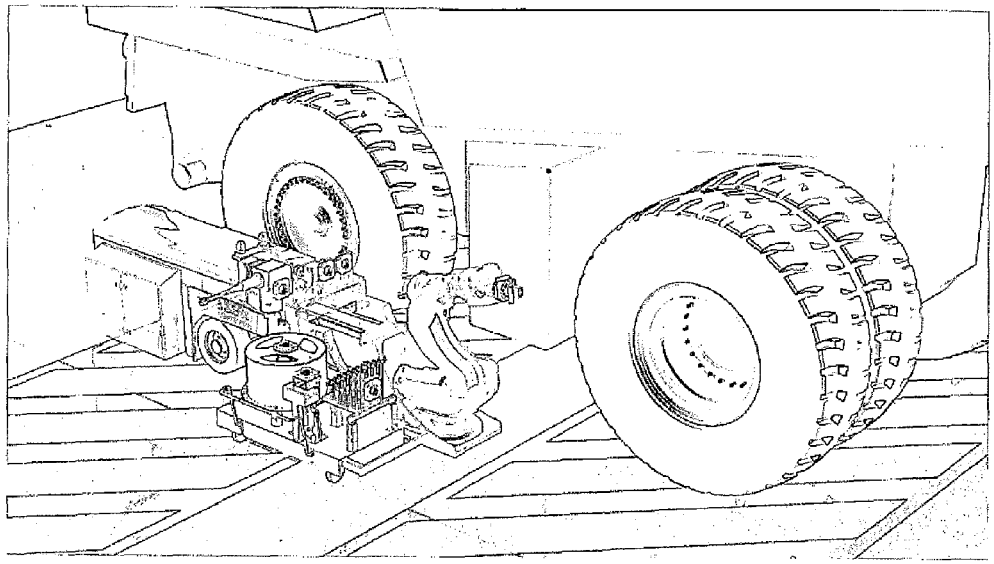
Figure 12 Boom Extending
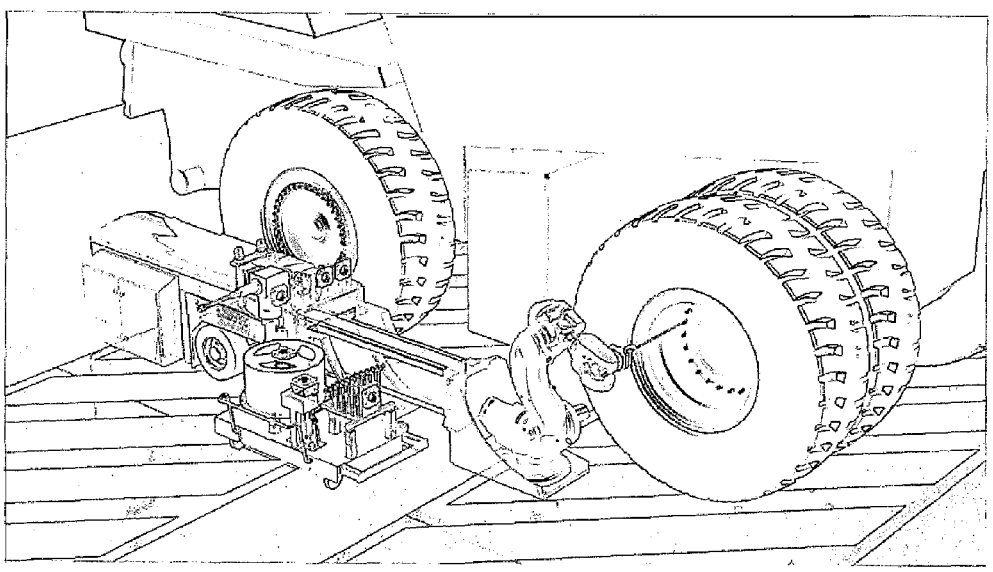
Figure 13 LASER Scanning Wheel

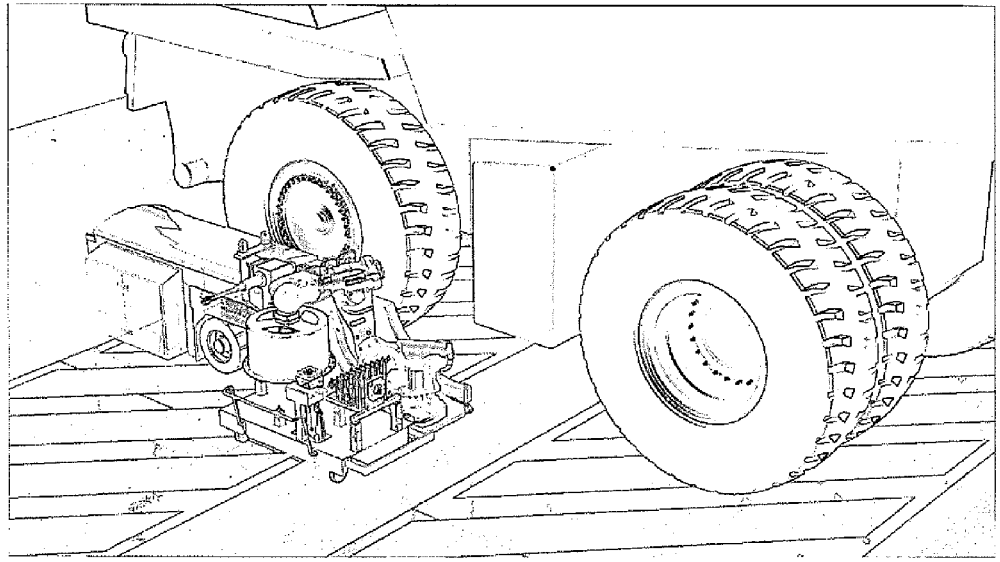
Figure 14 Picking up Rear Nut Nest
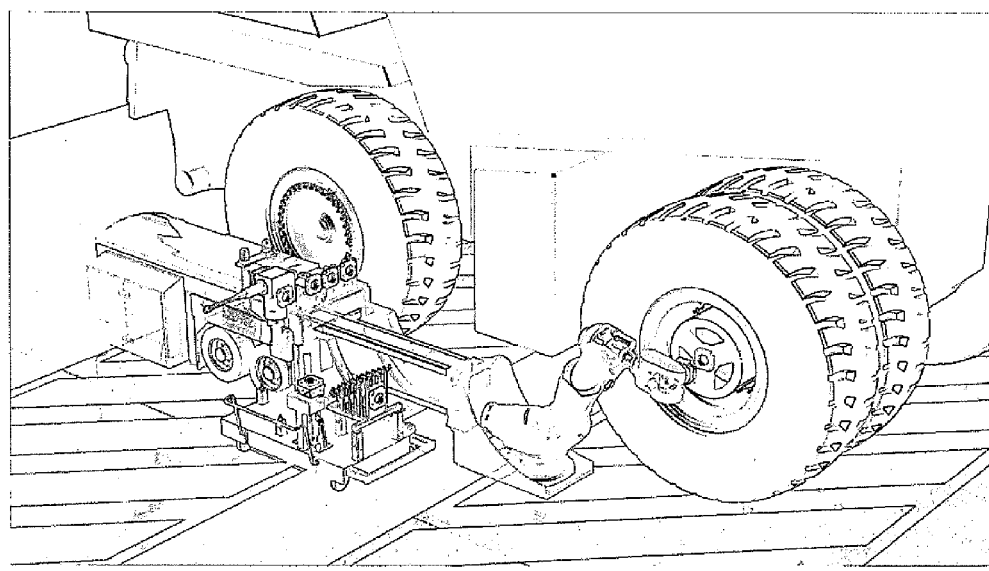
Figure 15 Securing Rear Wheel Nut Nest to Wheel Hub

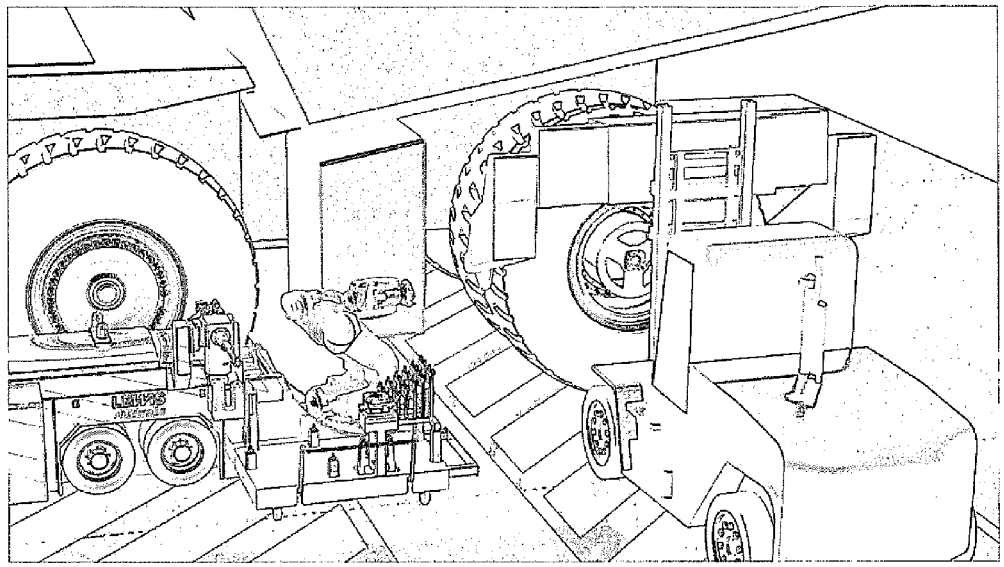
Figure 16 Wheel Handler Securing Wheel
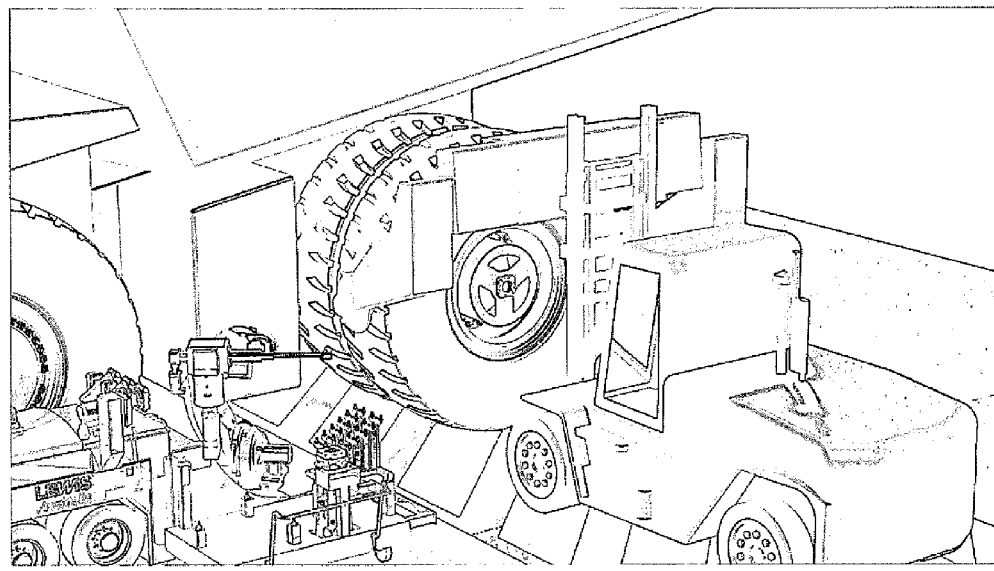
Figure 17 Picking up Nutrunner (Rear Wheel Configuration)

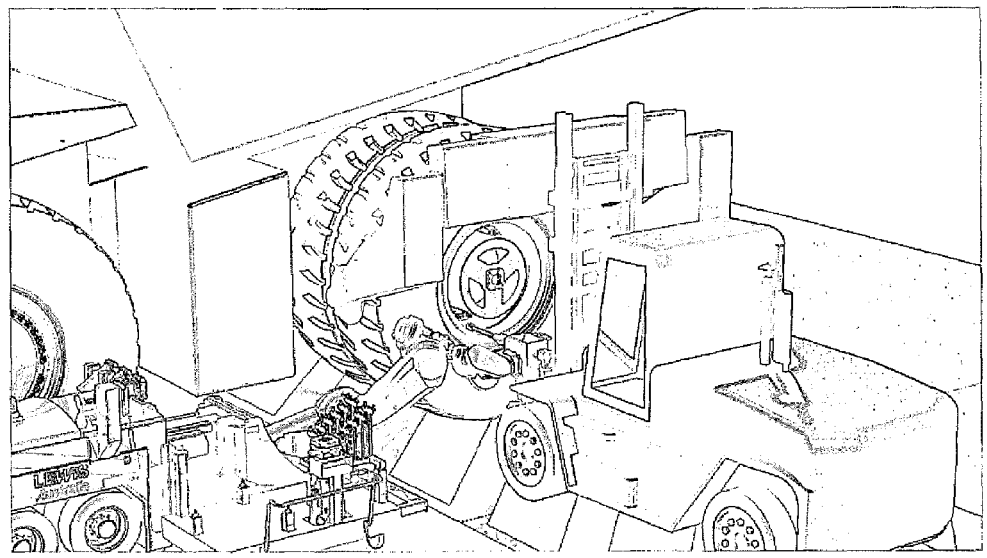
Figure 18 Ducking under Wheel Handler Arms
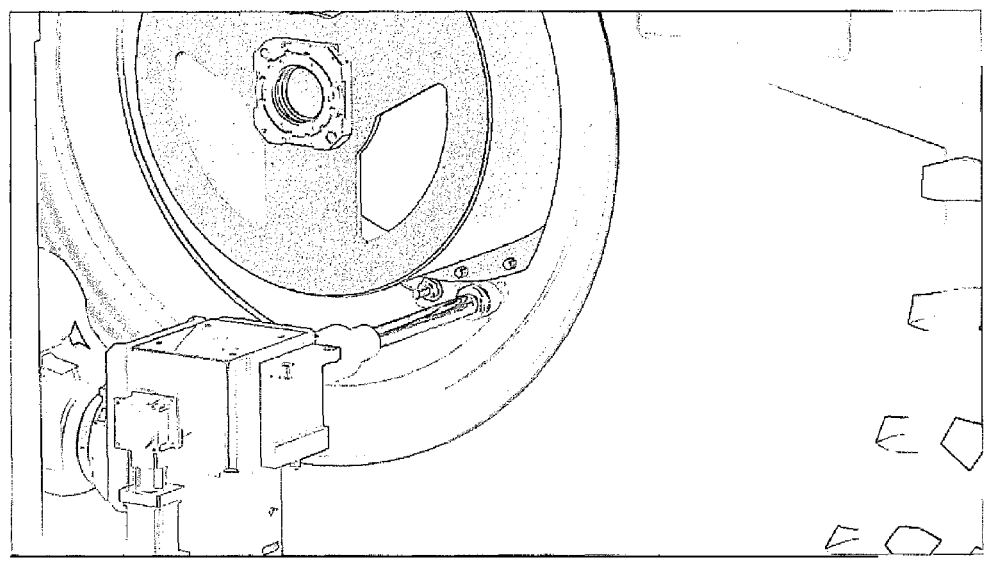
Figure 19 Removing First Wheel Nut

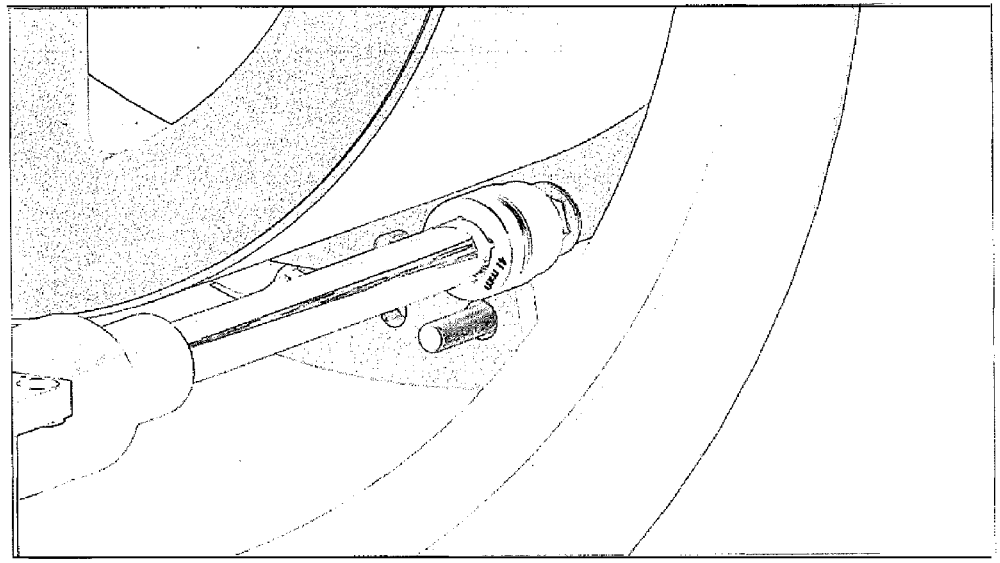
Figure 20 Fastening First Wheel Nut to Nest
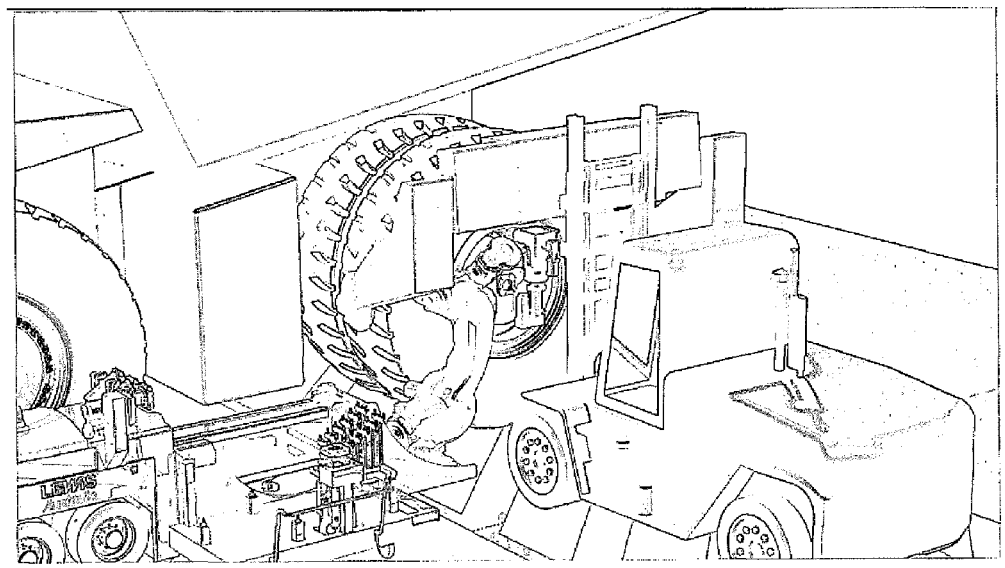
Figure 21 Removing Last Wheel Nuts

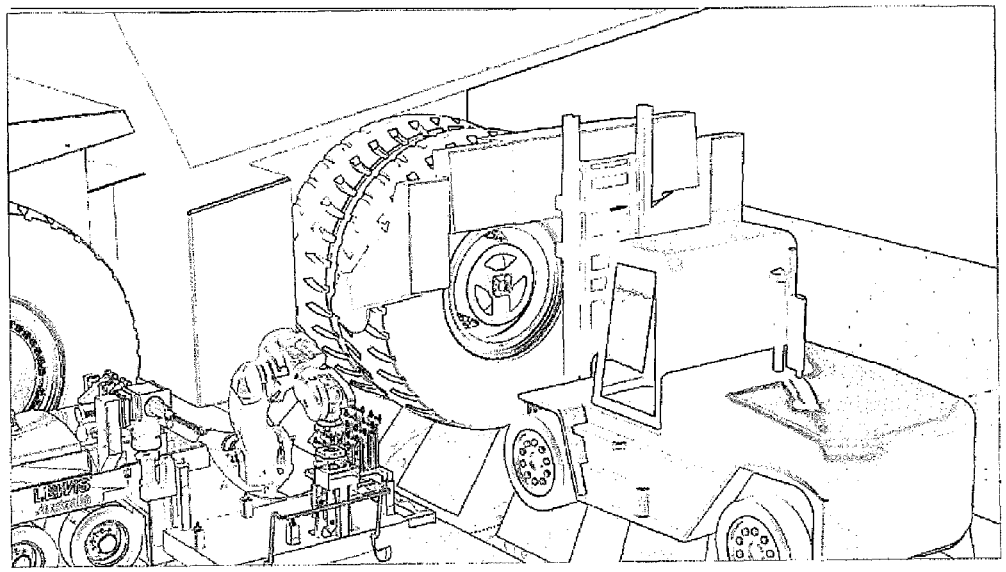
Figure 22 Picking up Rear Cleat Tool
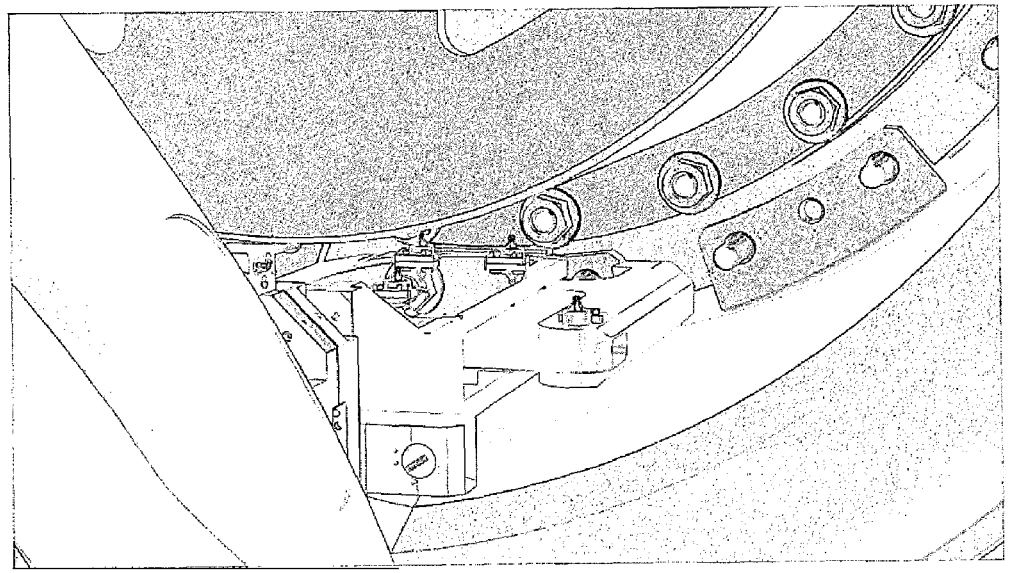
Figure 23 Gripping and Loosening First Cleat

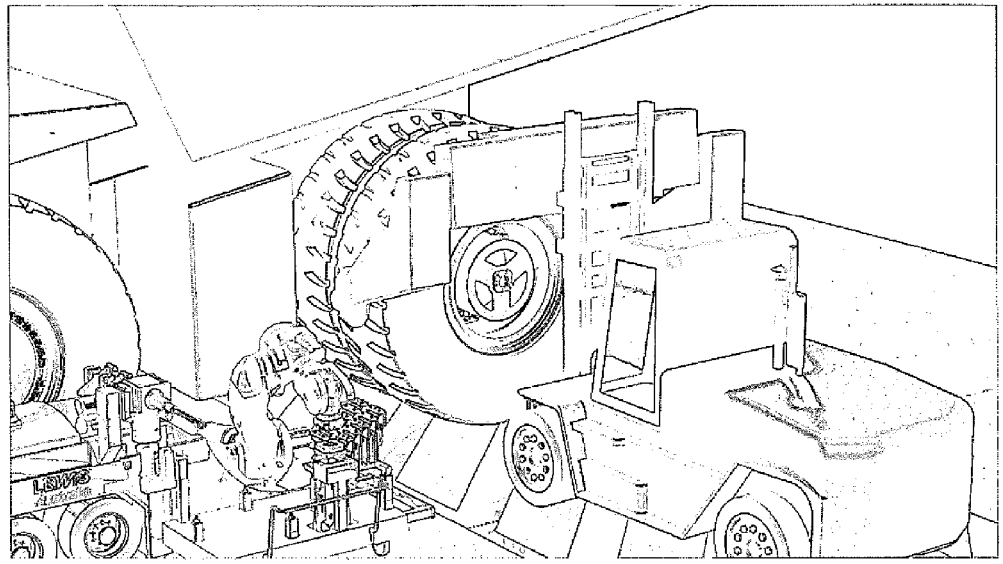
Figure 24 All Cleats Removed, Returning Rear Cleat Tool
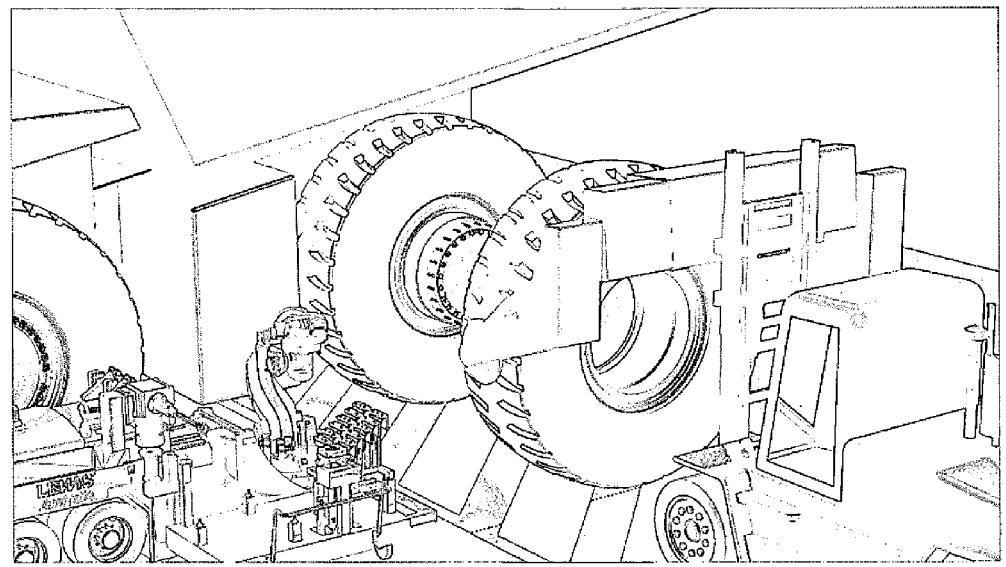
Figure 25 Removing Outer Wheel

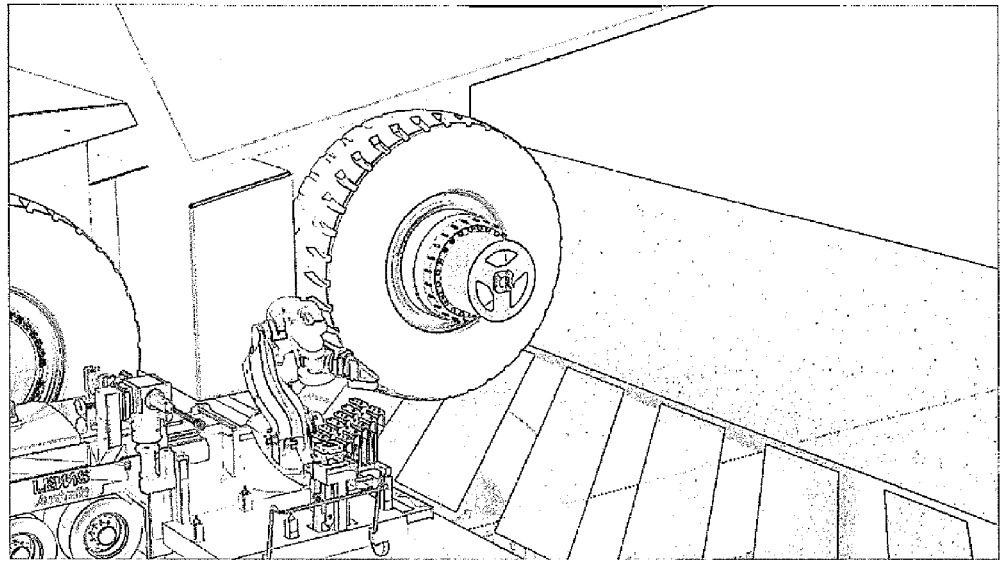
Figure 26 Picking up Spacer Ring Gripper
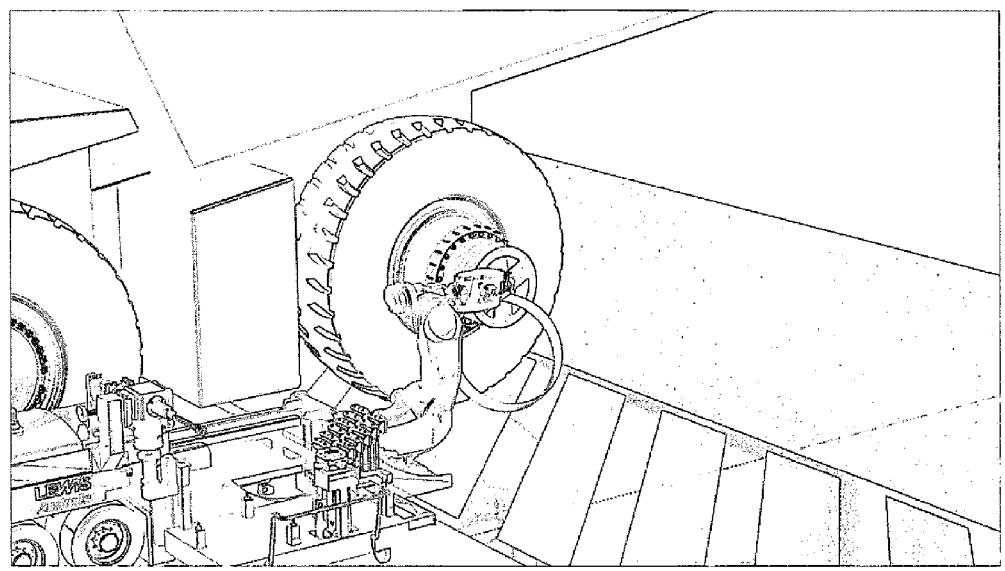
Figure 27 Removing Spacer Ring

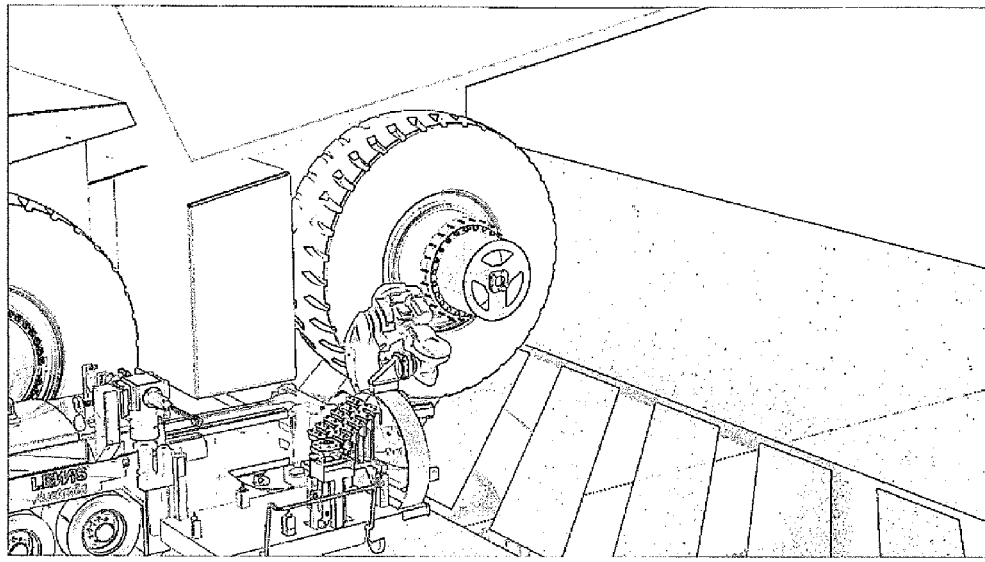
Figure 28 Placing Spacer Ring in Nest
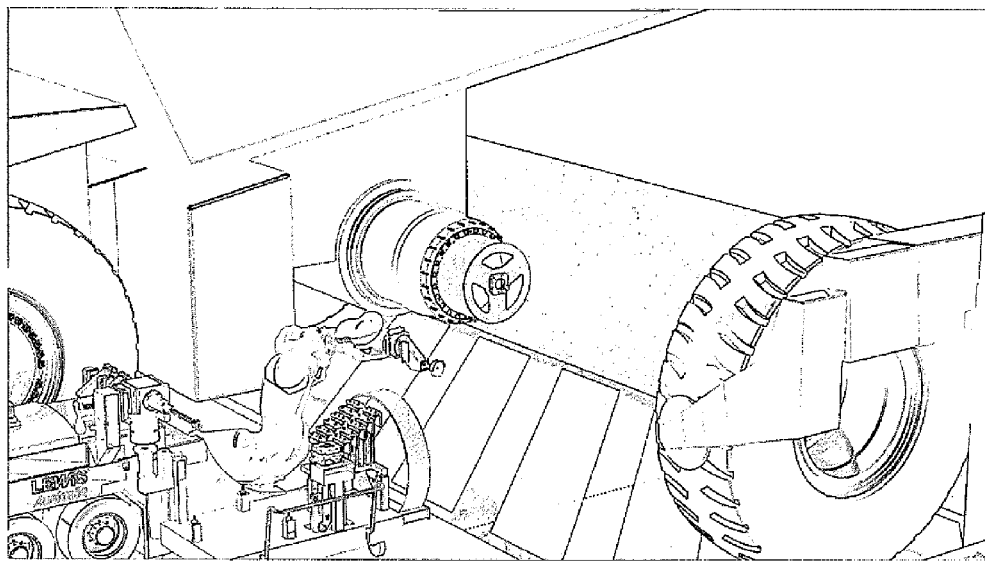
Figure 29 Picking up Buffing Tool and Removing Inner Wheel

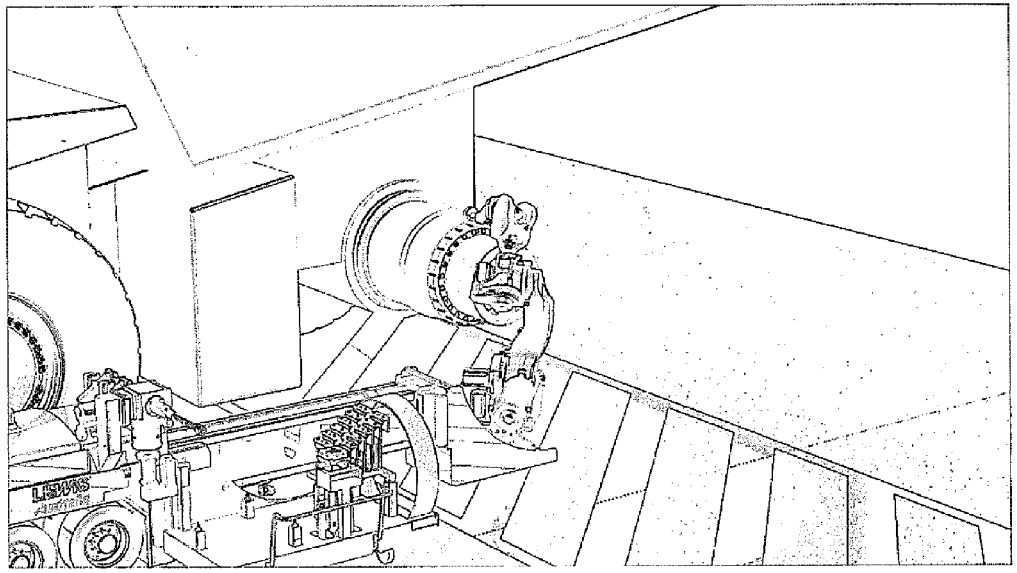
Figure 30 Buffing Wheel Hub
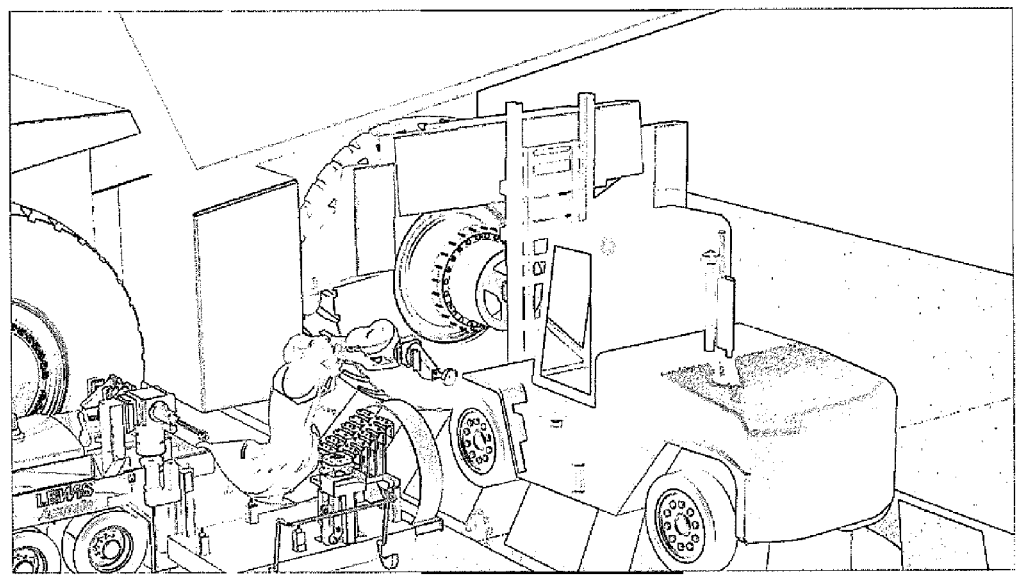
Figure 31 Returning Buffing Tool and Replacing Inner Wheel

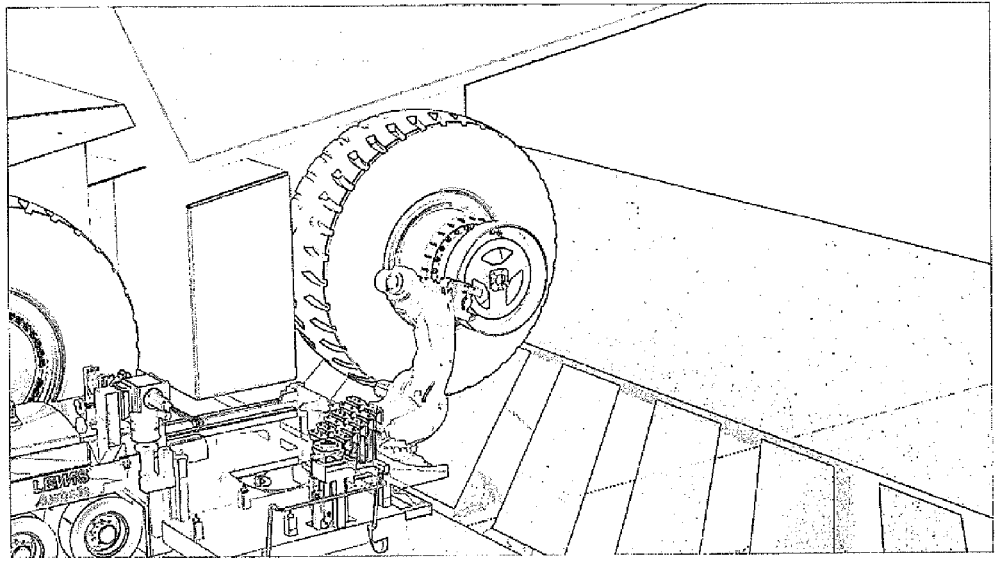
Figure 32 Replacing Spacer Ring
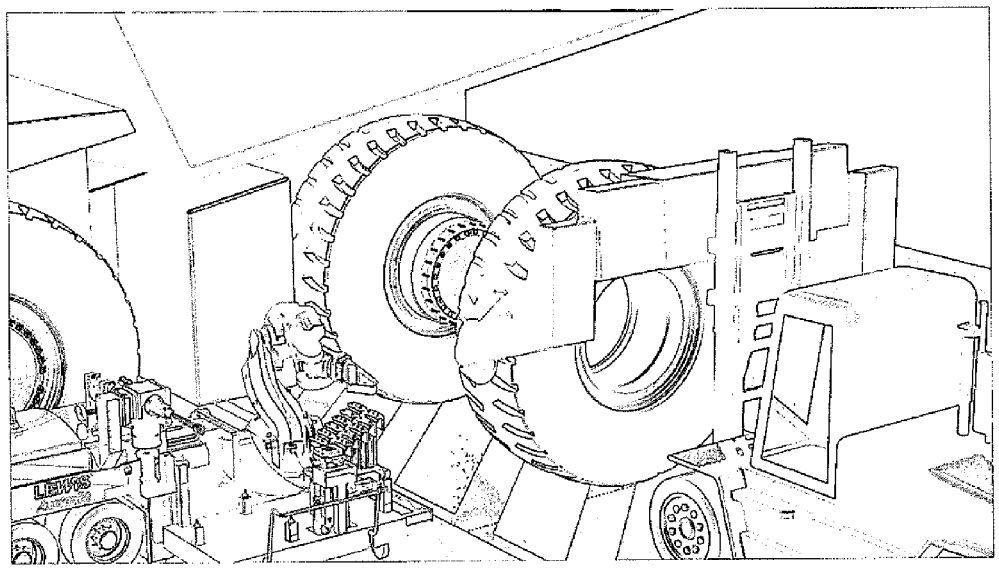
Figure 33 Returning Spacer Gripper Tool and Replacing Outer Wheel

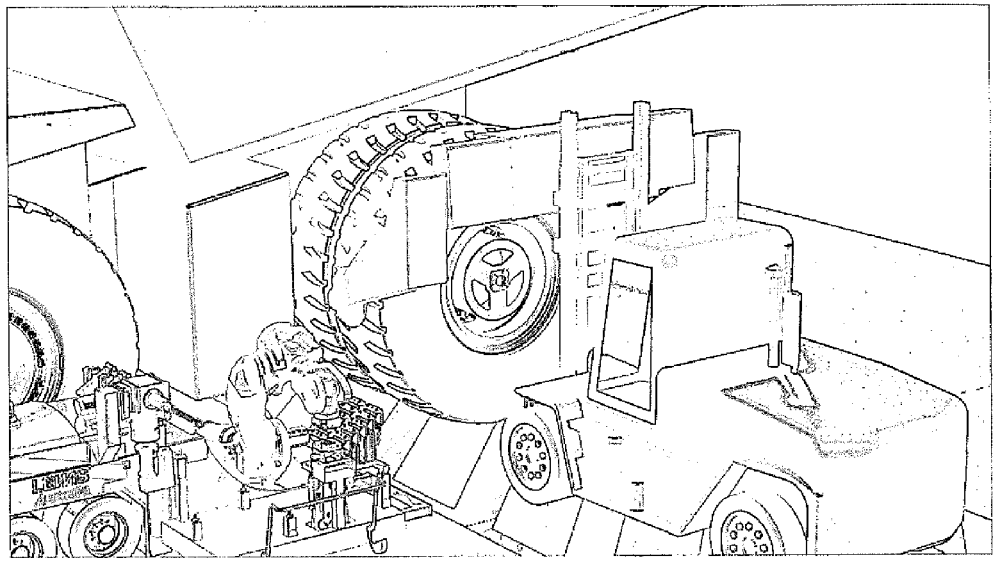
Figure 34 Picking up Rear Cleat Tool
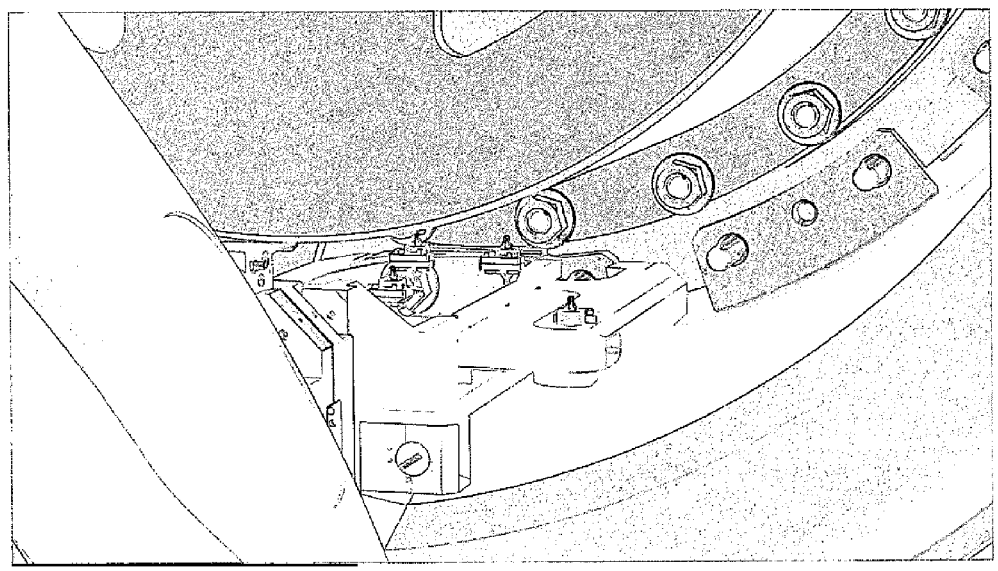
Figure 35 Inserting Last Cleat

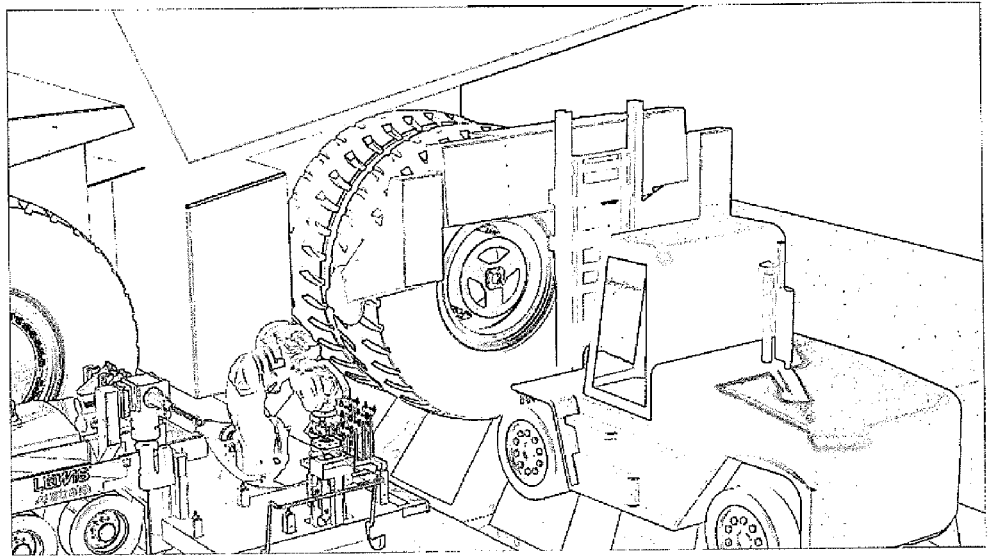
Figure 36 Returning Cleat Tool
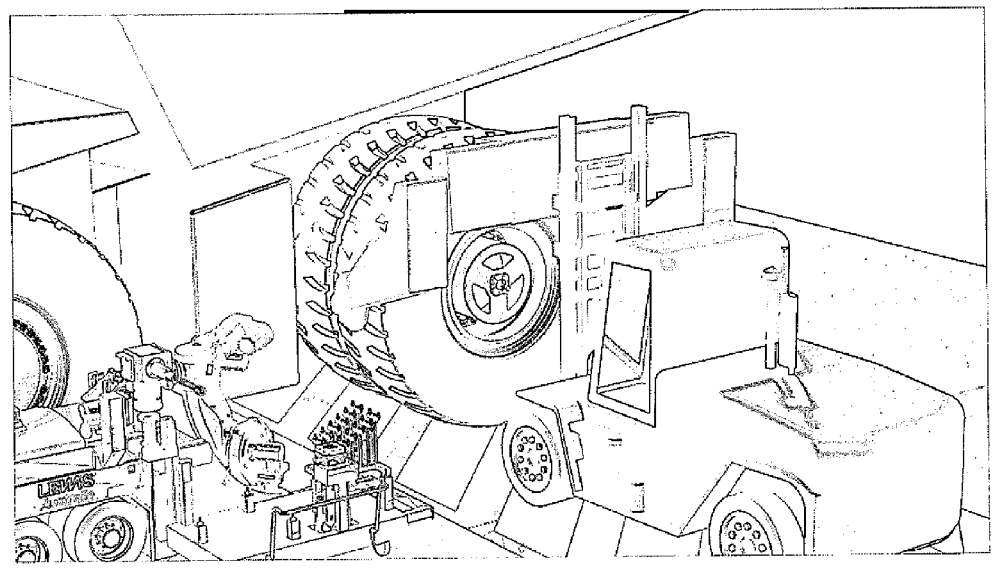
Figure 37 Picking up Nutrunner

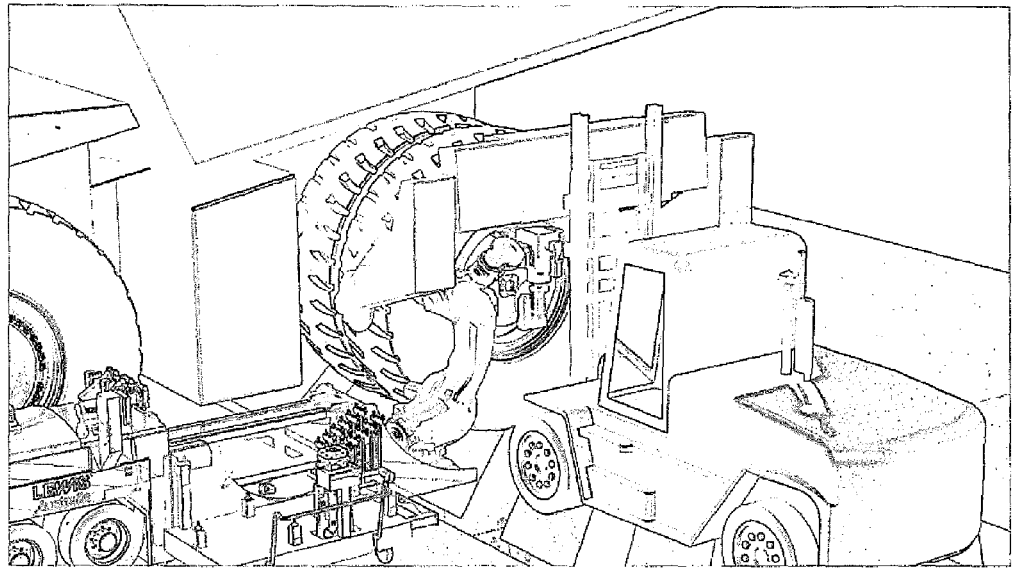
Figure 38 Replacing and Torquing First Wheel Nuts
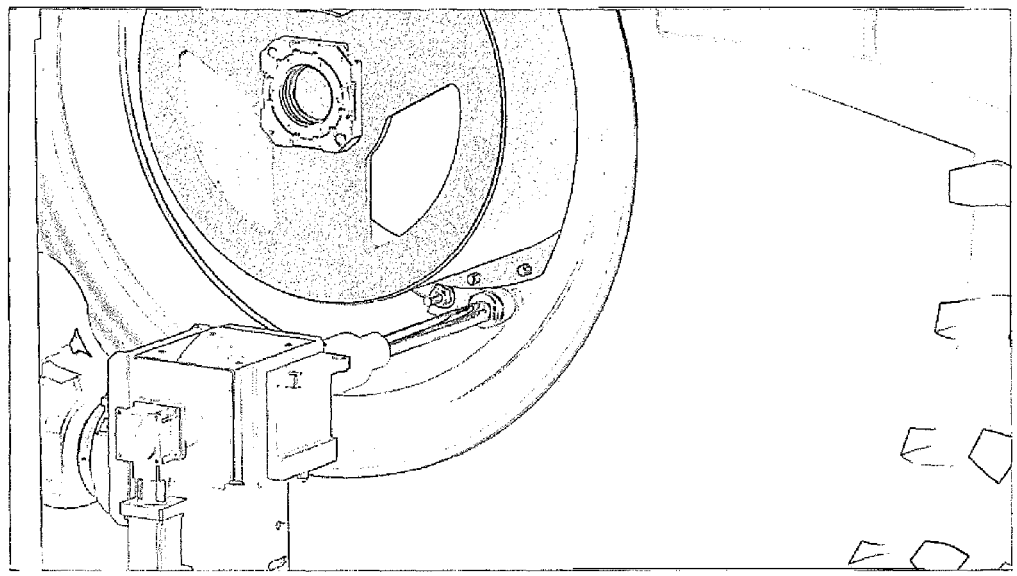
Figure 39 Replacing and Torquing Last Wheel Nuts

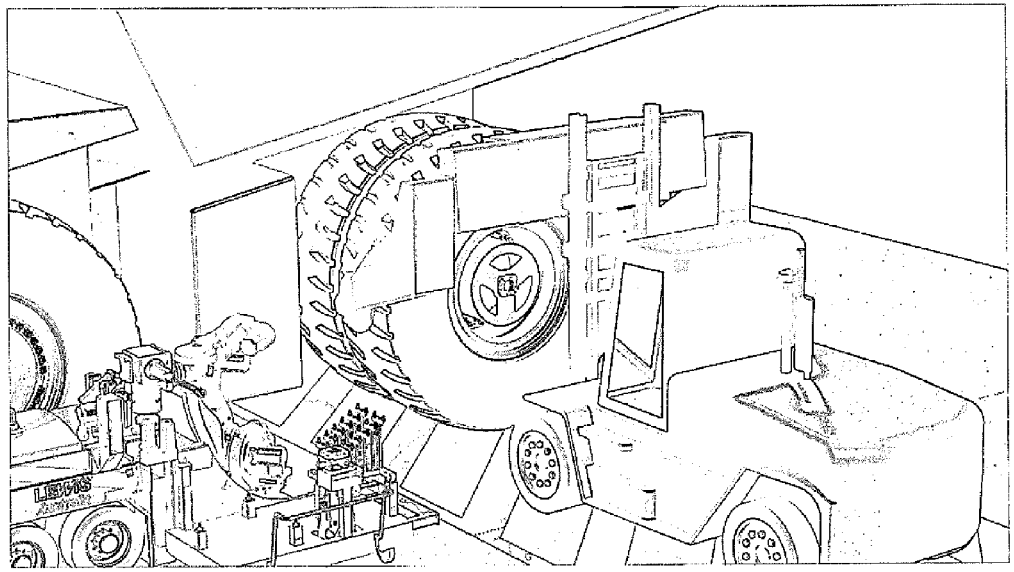
Figure 40 Returning Nutrunner
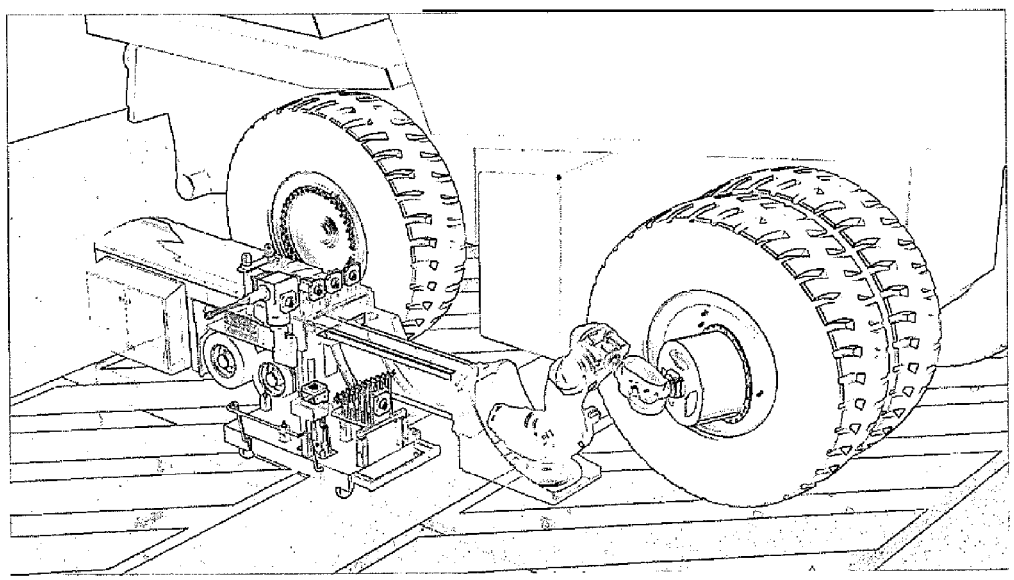
Figure 41 Removing Rear Wheel Nest

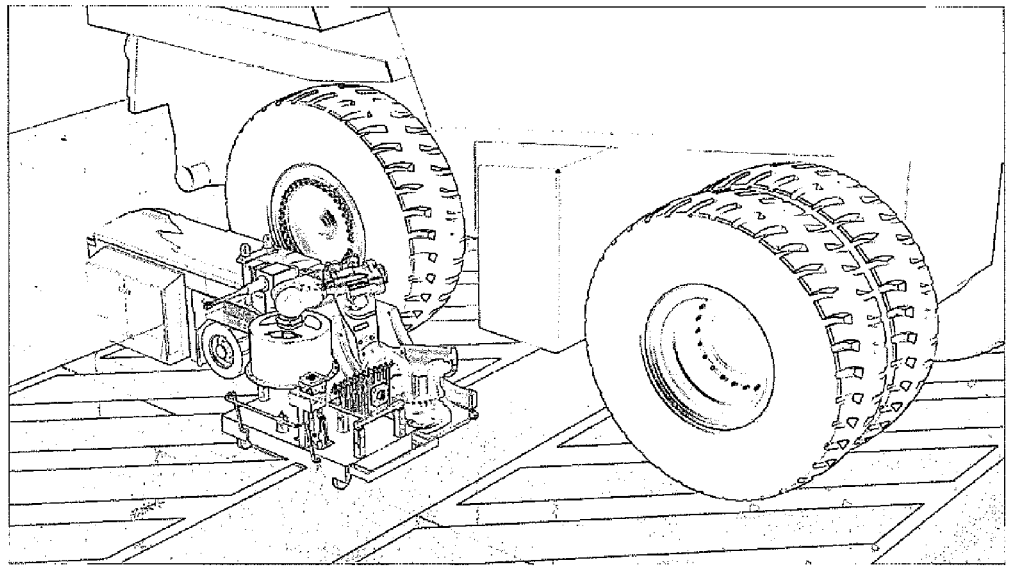
Figure 42 Returning Rear Wheel Nut Nest
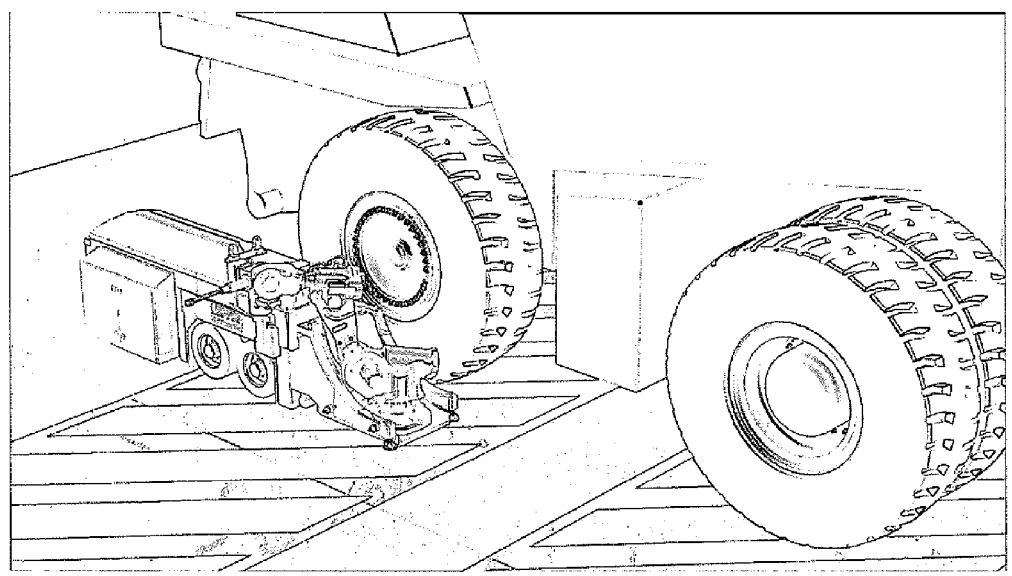
Figure 43 Moving MBU to Front Wheel Position

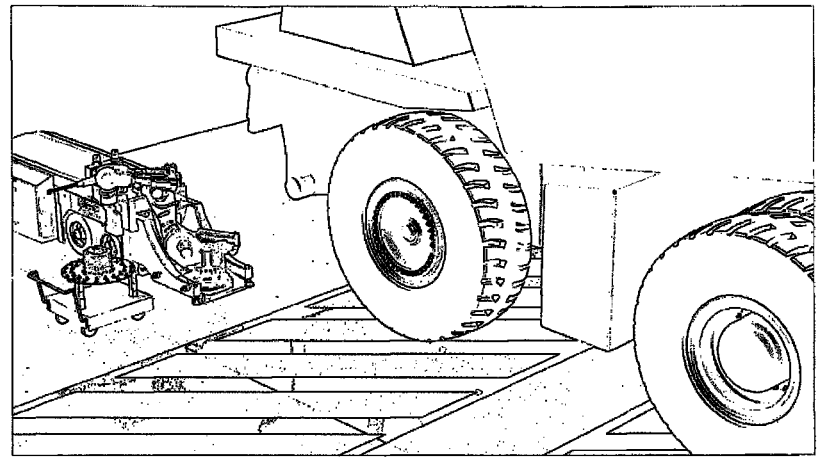
Figure 44 Front Wheel Tooling Pallet Docking with MBU
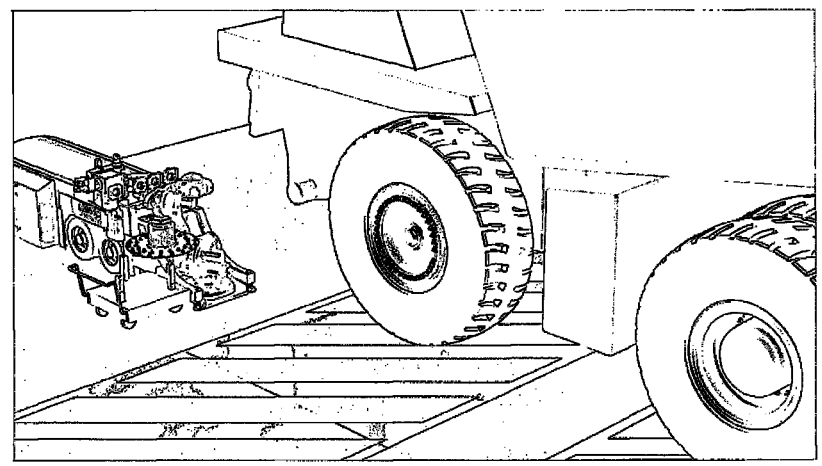
Figure 45 Picking up Front Wheel Nut/Cleat Nest

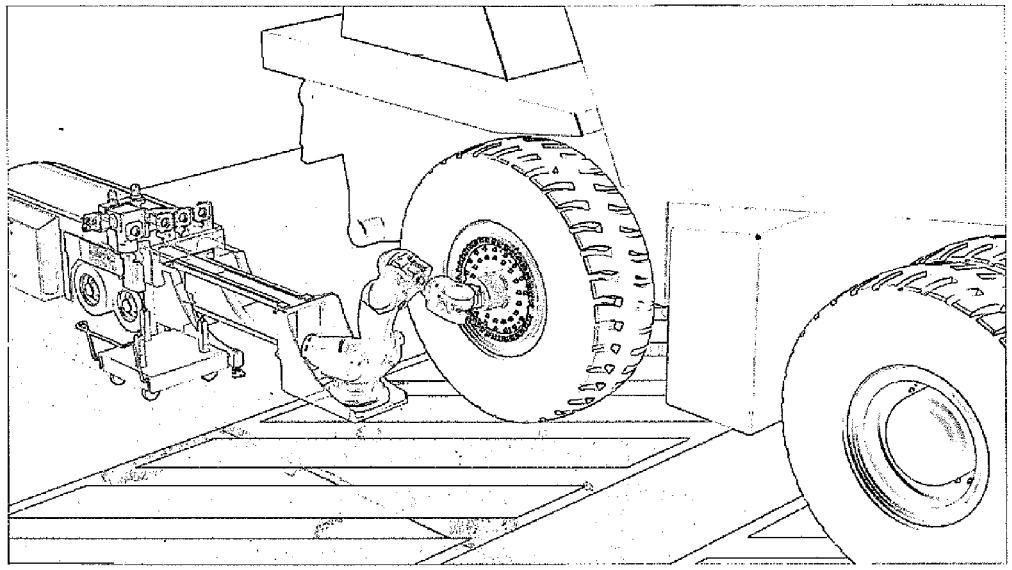
Figure 46 Securing Front Wheel Nut/Cleat Nest to Front Wheel
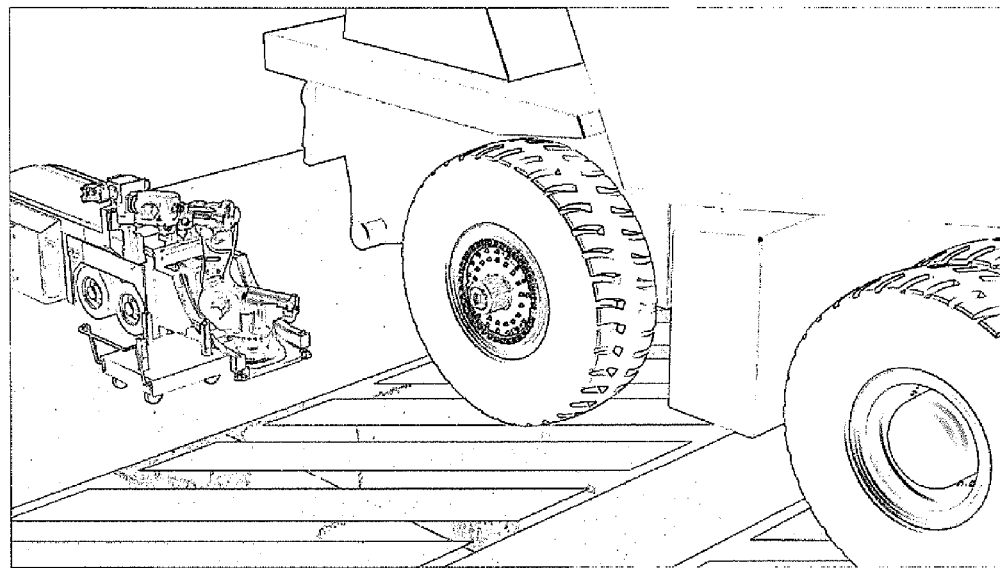
Figure 47 Picking up Nutrunner (Front Wheel Configuration)

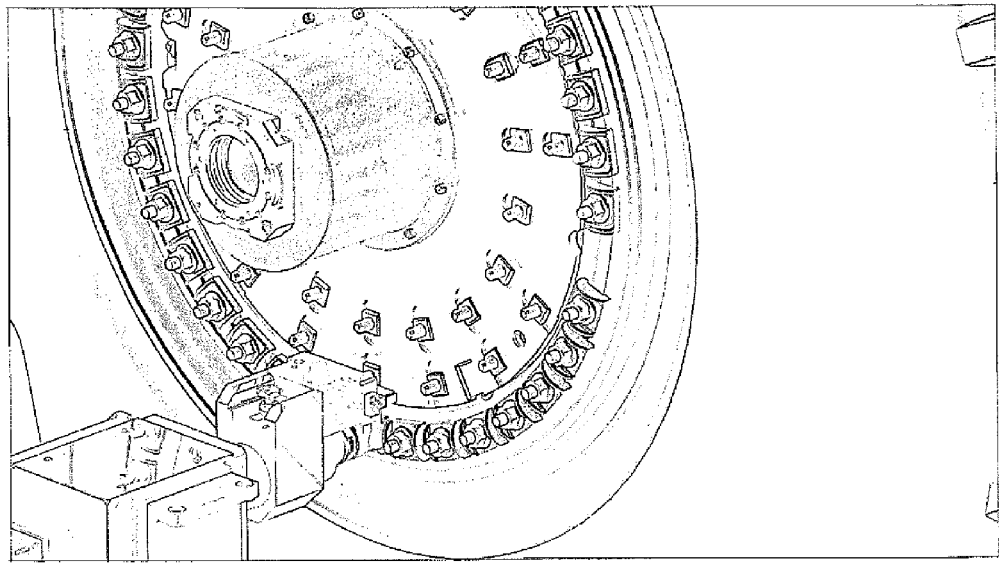
Figure 48 Removing First Nut and Cleat
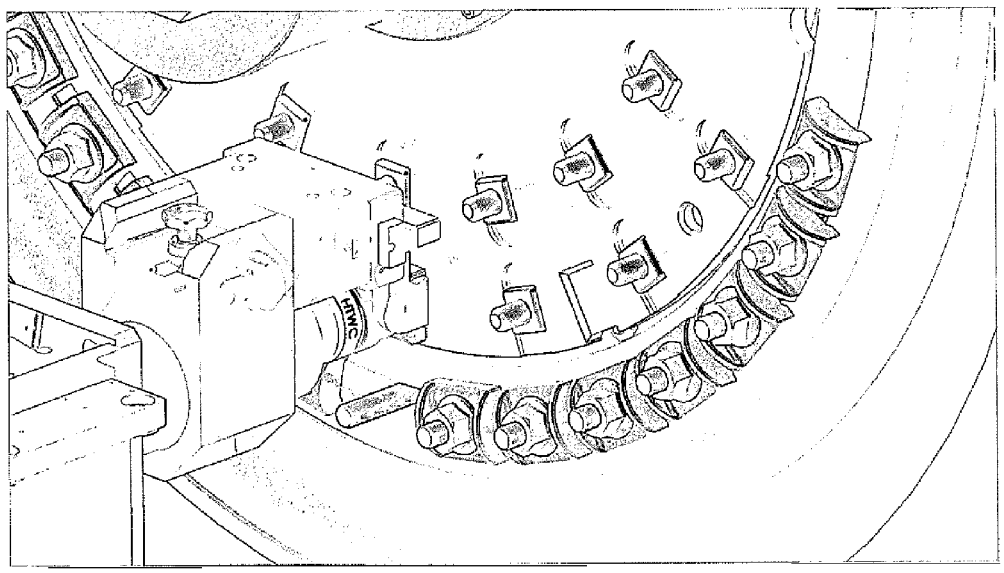
Figure 49 Securing First Nut and Cleat

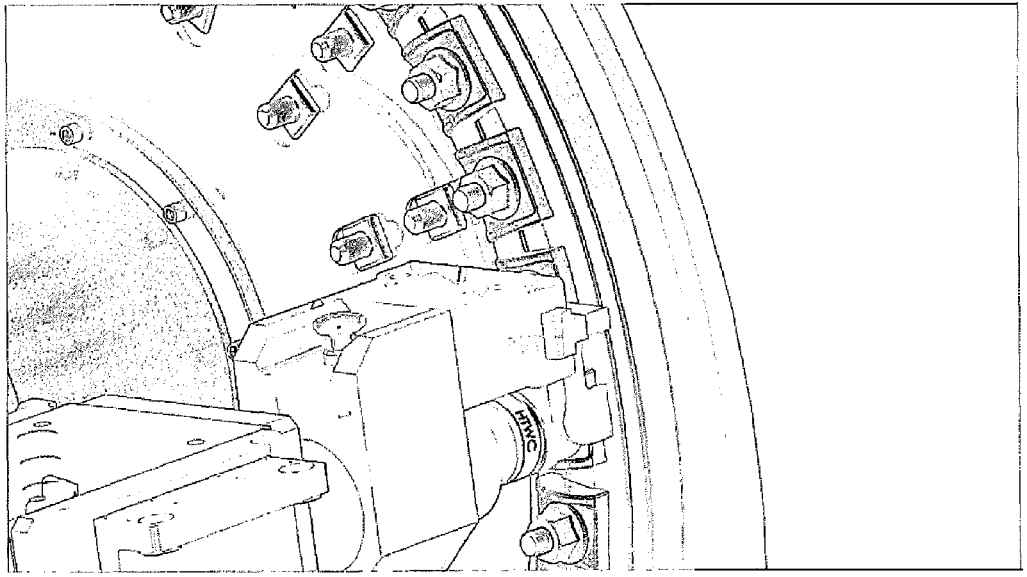
Figure 50 Removing Second Nut and Cleat
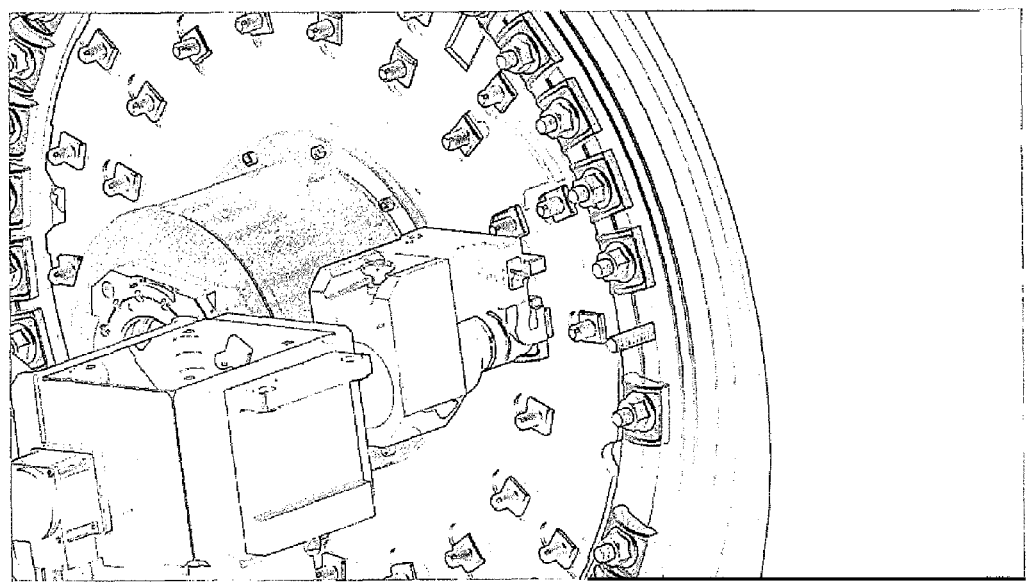
Figure 51 Fastening Second Nut and Cleat to Nest

VEHICLE WHEEL CHANGING METHOD

CROSS-REFERENCE TO RELATED APPLICATIONS

The present application is a U.S. National Phase filing of International Application No. PCT/AU2012/000020, filed on Jan. 12, 2012, designating the United States of America and claiming priority to Australia Patent Application No. 2011900085, filed Jan. 12, 2011, Australia Patent Application No. 2011900086, filed Jan. 12, 2011, and Australia Patent Application No. 2011900087, filed Jan. 12, 2011, and this application claims priority to and the benefit of the above-identified applications, which are incorporated by reference herein in their entireties.

FIELD OF THE INVENTION

This invention relates to techniques for changing wheels on wheeled vehicles, for example the wheels of large vehicles such as mining haul trucks.

Open pit mines generally employ fleets of very large mining haul trucks. The wheels of those trucks must be changed regularly as the tyres wear or sustain damage. Wheel changing is a time consuming and hazardous operation. Conventionally hand tools are used to remove and replace wheel nuts and retainer cleats by operators working in an area between the wheel and a wheel handler brought into grip and remove the wheel when the nuts and cleats have been removed. The present invention will enable wheel changing without the need for operators to work in this dangerous zone.

SUMMARY OF THE INVENTION

According to the invention there may be provided a method for changing a vehicle wheel held to the vehicle by nuts and retainer cleats comprising:
 using a mobile robot for removal and replacement of the wheel nuts and retainer cleats in combination with the use of a mobile mechanical wheel handler to grip and remove the wheel and to bring a replacement wheel into position before replacement of the wheel nuts and cleats by the robot.

The method may further comprise the step of laser scanning the wheel to identify the positions of the wheel nuts and retainer cleats and controlling operation of the robot in accordance with the positions so determined.

The invention also extends to a method for changing a vehicle wheel held to the vehicle by nuts and retainer cleats, comprising:
 laser scanning the wheel to identify the positions of the wheel nuts and retainer cleats;
 operating a mobile robot to remove the wheel nuts and retainer cleats;
 operating a mechanical wheel handler to remove the wheel and to replace it with a replacement wheel; and
 operating the mobile robot to replace the wheel retainer cleats and the nuts.

The wheel handler may be an operator driven vehicle fitted with wheel gripper jaws.

The laser scanning may be performed by the mobile robot operating to manipulate a laser scanner tool.

The mobile robot may remove the wheel nuts and retainer cleats by manipulation of one or more removal tools in accordance with the positions of the nuts and cleats determined by the laser scanning.

The one or more removal tools may comprise a nut runner for operation in the removal and replacement of the nuts and a cleat gripper to grip the wheel cleats for removal and replacement of the cleats.

The nut runner and the wheel cleat gripper may be incorporated into a single removal tool or be provided in separate removal tools.

On removal each nut and cleat may be deposited by operation of the robot and respective removal tool at an individual storage location unique to that nut or cleat and for replacement each nut and cleat may then be retrieved by the robot from that individual storage location.

The storage locations for the nuts and cleats may be provided by one or more storage nests.

The nut storage locations may be provided by a nut nest placed on the wheel hub by the robot prior to removal of the nuts and cleats.

The nut nest may remain on the wheel hub during removal of the wheel and replacement by a replacement wheel by operation of the wheel handler.

The cleat storage locations may be provided by a cleat nest positioned by the robot on the ground adjacent the wheel.

The cleat nest may be positioned on the ground by the robot after the nuts have been removed and placed on the nut storage nest.

In an alternative the cleat nest may be located adjacent to the mobile robot.

The cleat nest may form part of a larger tool storage pallet.

In an alternative the nut and cleat storage locations may be provided by a nut and cleat storage nest located adjacent to the mobile robot.

The combined nut and cleat nest may form part of a larger tool storage pallet.

In an alternative the nut and cleat storage locations may be provided by a combined nut and cleat storage nest placed on the wheel hub by the robot prior to removal of the nuts and cleats. In that case the nut and cleat storage nest may remain on the wheel hub during removal of the wheel and replacement with a replacement wheel by operation of the wheel handler.

The one or more removal tools may comprise a gripper tool to remove a spacer ring or rings.

Buffing of the wheel hubs may be provided by a separate buffing tool.

In an alternative the spacer gripper tool and buffing tool may be provided by a combined tool.

The robot may be mounted on a self-propelled and steerable vehicle.

The self-propelled vehicle may run on one or more rails.

The invention may also provide a robotic apparatus comprising:
 a moveable vehicle;
 a robot carried by the vehicle and comprising a tool manipulator;
 a scanner tool manipulable by the tool manipulator and operable by the robot to identify a set of features at locations within a target range from the vehicle; and
 a specific task tool manipulable by the tool manipulator and operable by the robot repetitively to perform a specific task at a plurality of said locations.

The apparatus may further comprising a scanner tool holder to hold the scanner tool when not in use and the tool manipulator is operable to pick up the scanner tool and operate that tool to identify said set of features and then return it to the scanner tool holder.

The scanner tool holder may be on the vehicle or on a trolley attachable to the vehicle.

The invention may further comprise a specific task tool holder to hold the specific task tool when not in use and the tool manipulator is operable after the scanner tool has identified said set of features to pick up the specific task tool and move it sequentially to said plurality of locations for performance of said specific task at each of said plurality of locations.

More specifically, the invention may provide a robotic apparatus for robotically performing specific tasks required in a vehicle wheel changing operation, comprising a moveable vehicle positionable in the vicinity of a vehicle wheel to be removed;
- a robot carried by the vehicle and comprising a tool manipulator;
- a laser scanner tool manipulable by the tool manipulator and operable by the robot to identify a set of wheel retainer nuts and wheel retainer cleats on the wheel and to determine the locations of the nuts and cleats; and
- one or more specific task tools manipulable by the tool manipulator and operable by the robot to remove the nuts and cleats from the wheel.

The invention may further provide a location sensing system for detecting the locations of wheel retaining nuts and/or cleats on a vehicle wheel, comprising;
- a laser distance measuring device; and
- a manipulator to move the laser distance measuring device in a two way scan to identify the plane of the wheel rim and an arcuate scan to identify the angular orientations of the nuts and/or cleats.

BRIEF DESCRIPTION OF THE DRAWINGS

In order that the invention may be more fully explained, one specific wheel changing method for changing of wheels on large mining haul trucks will be described in detail with reference to the accompanying drawings in which

FIGS. 12 to 51 diagrammatically illustrate successive steps in wheel changing operations.

DETAILED DESCRIPTION OF THE PREFERRED EMBODIMENT

Figure 1:
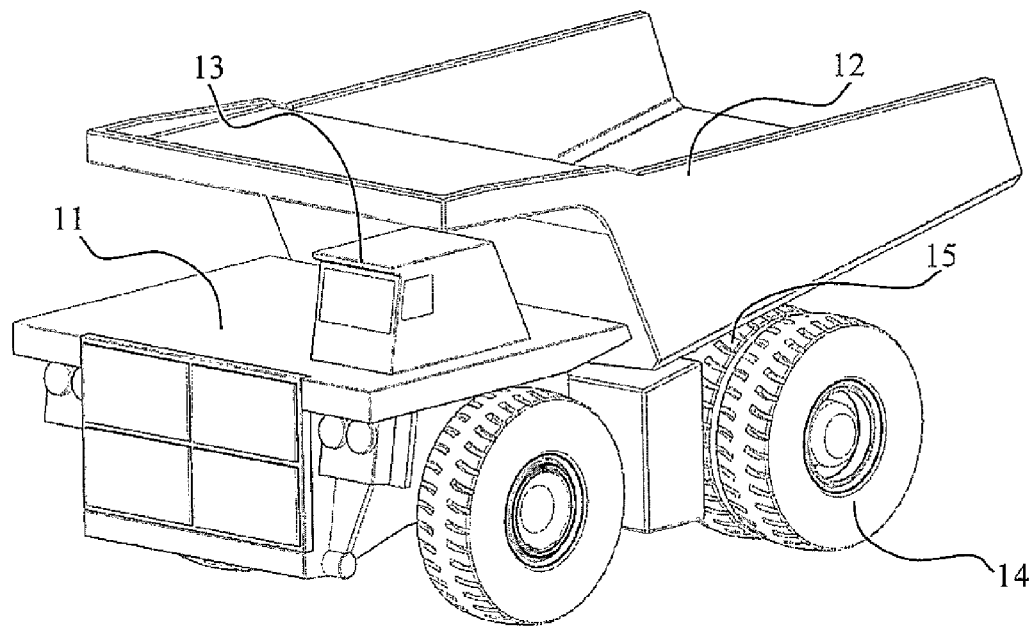
FIG. 1 illustrates a typical mine haul truck with dual rear wheels and single front wheels.

FIG. 1 illustrates a typical mine haul truck 11 having an ore carrier bin 12, a drivers cabin 13 and fitted with dual rear wheels 14 and single front wheels 15.

Figure 2:
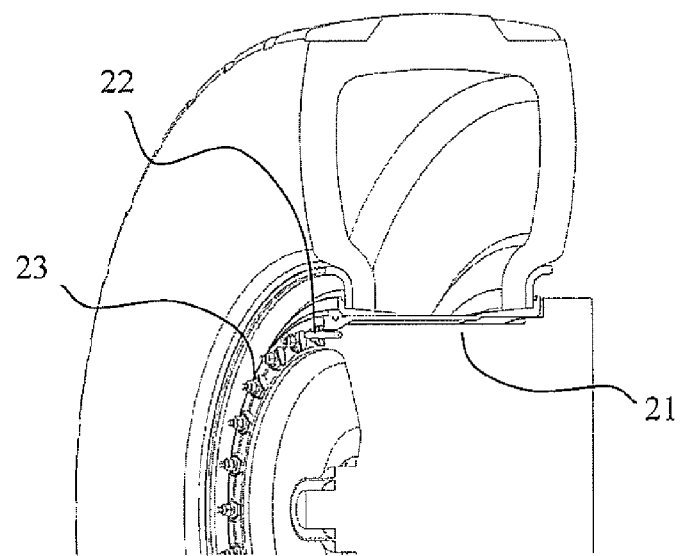
FIG. 2 illustrates the haul truck front wheel fastening arrangement.

As shown in FIG. 2 the single front wheels of the haul truck are fastened on a tapered wheel hub 21 by fastening studs 22 and cleats 23.

Figure 3:
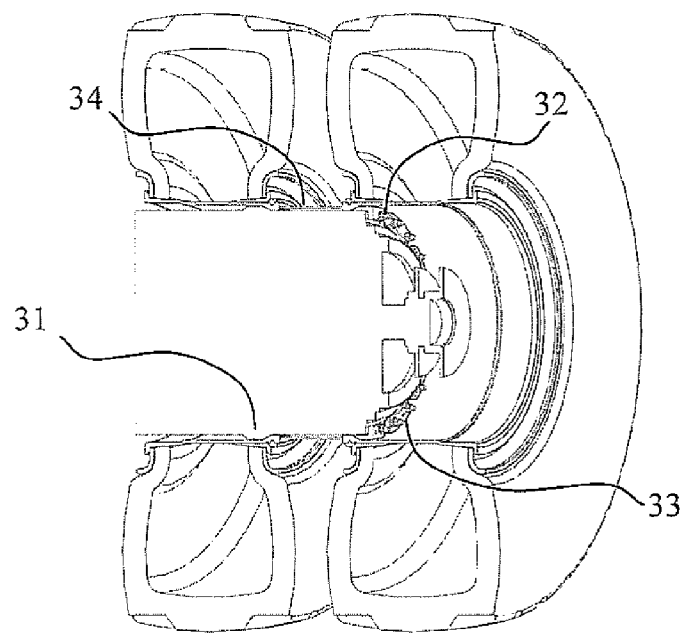
FIG. 3 illustrates the rear wheel fastening arrangement.

As illustrated in FIG. 3 the dual rear wheels of the haul truck are held onto the tapered rear wheel hub 31 by studs 32 and cleats 33 with a spacer ring 34 extended between the inner and outer wheels of each pair. In order to replace the front or rear wheels of the haul truck the respective studs (22 or 32) and cleats (23 or 33) must be removed and replaced. In the case of the rear wheels the spacer ring 34 must also be removed after the outer wheel has been taken away and before the inner most wheel is removed.

During the removal and replacement of nuts and cleats the wheels must be held by a wheel handler to eliminate the potential for a wheel to fall. Conventionally this requires an operator to work with hand held tools in the space between the wheel and the wheel handler which is referred to as the explosion and crush zone. The robotic apparatus 41 illustrated generally at FIG. 4 has been developed to enable wheel stud and cleat removal and other wheel changing functions to be performed robotically without the need for an operator to work in close proximity to the wheels. It comprises a Mobile Base Unit (MBU) in the form of a moveable wheel vehicle 42 which carries a robot 43 comprising a tool manipulator 44 including robot arms rotatable about several robotic axes. The robot is mounted on an extendible beam 45 which can be extended and retracted from the vehicle. The vehicle 42 incorporates a robot control cabinet 46 and control systems are housed within electrical enclosures 47.

Robots rely on being rigidly mounted to achieve accuracy of position. To ensure that the robot is not subject to movement from the vehicle suspension or tyres, the vehicles wheels are mounted on hydraulically actuated pivots that retract lowering the vehicle to the ground onto three adjustable pads 48.

Figure 6:
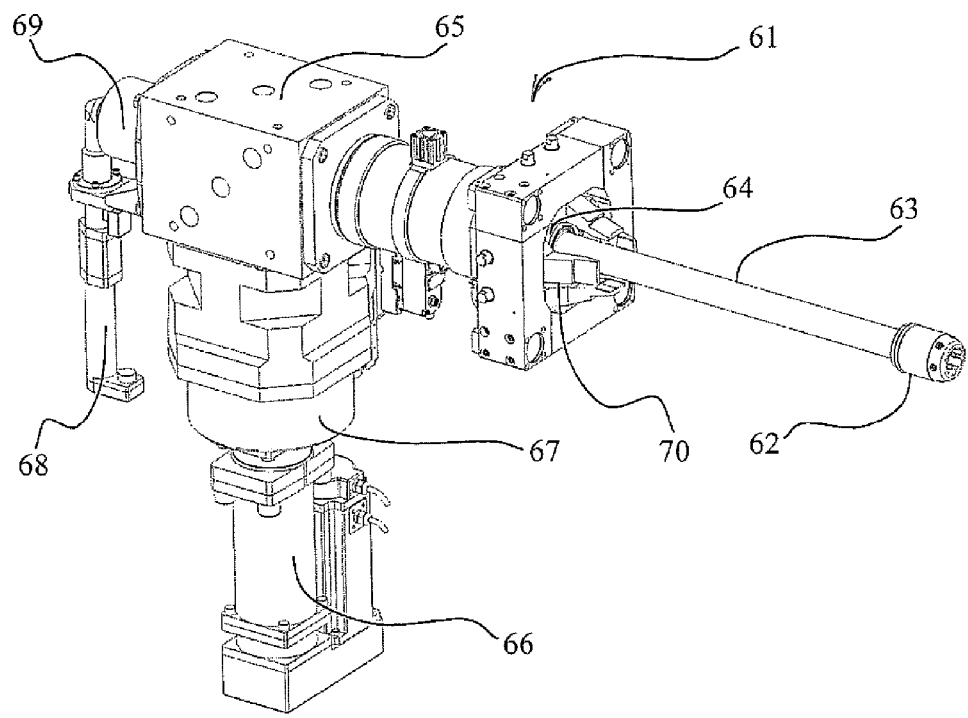
FIG. 6 illustrates a combined nut runner and cleat gripper tool for use in connection with the front and rear wheels of the haul truck.
Figure 7:
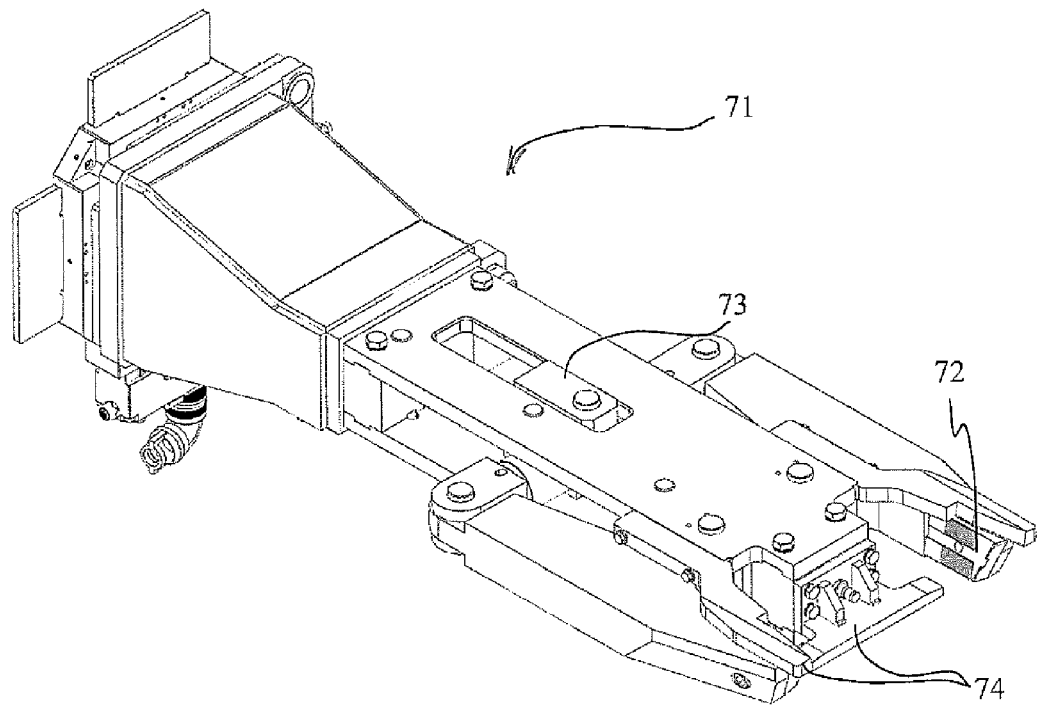
FIG. 7 illustrates a wheel cleat removal tool for removal of rear wheel cleats.
Figure 8:
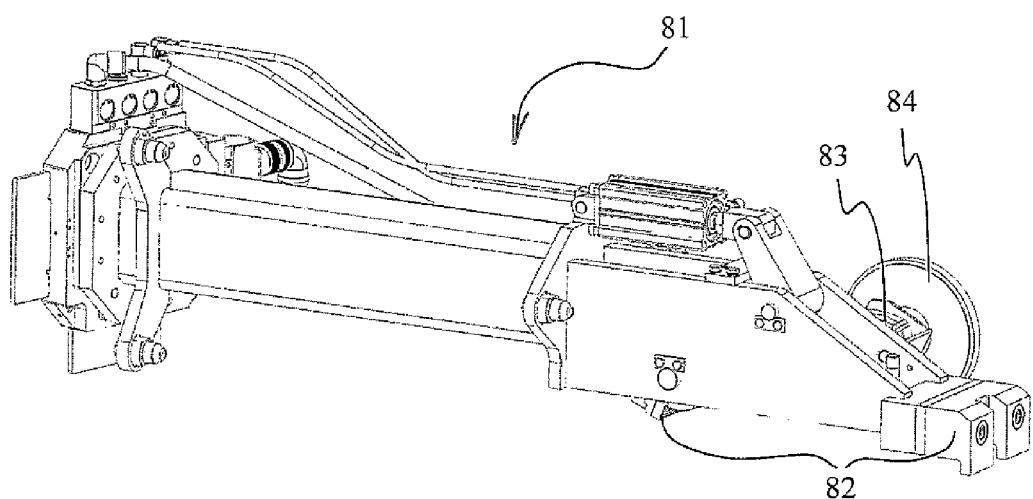
FIG. 8 illustrates a combined spacer ring gripper and wheel hub cleaning tool.

In operation the robot picks up, manipulates and operates a number of tools to perform the various functions required during a wheel changing operation as will be described in detail with reference to FIGS. 12 to 51. Specifically there is a laser scanning tool 51 illustrated in FIG. 5, a front nut runner/cleat gripper and rear wheel nut runner 61 as illustrated in FIG. 6, a rear wheel cleat gripper tool 71 as illustrated in FIG. 7, rear wheel spacer ring gripper and wheel hub cleaning tool 81 as illustrated in FIG. 8.

Figure 4:
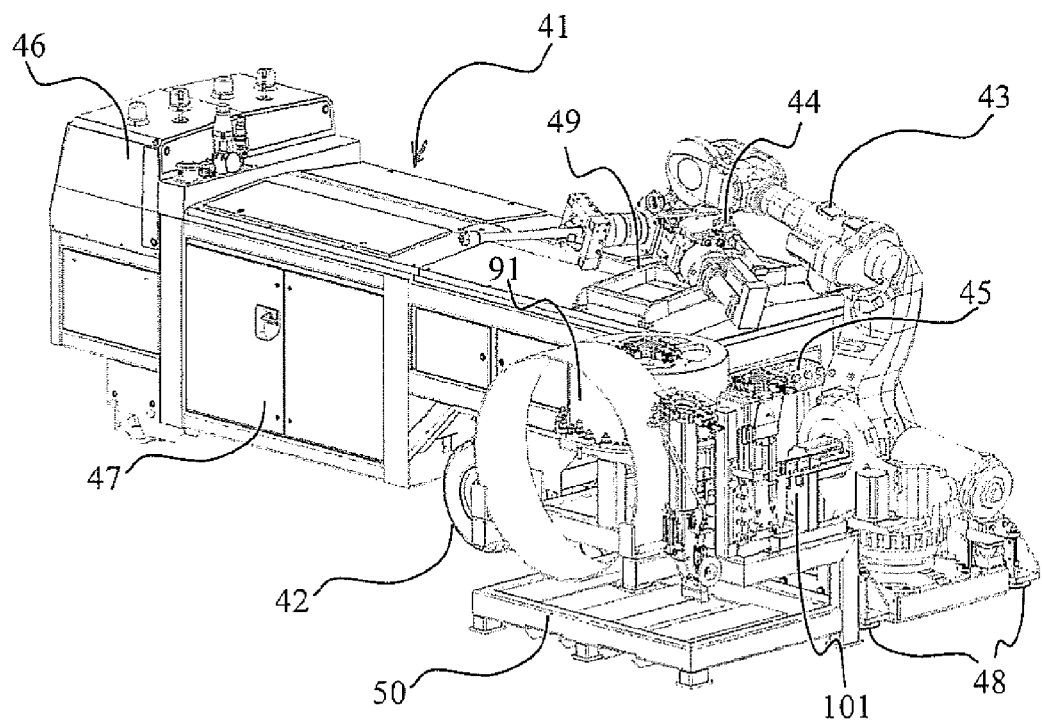
FIG. 4 illustrates a robotic apparatus designed to automatically carry out functions required for changing wheels of the haul truck.
Figure 9:
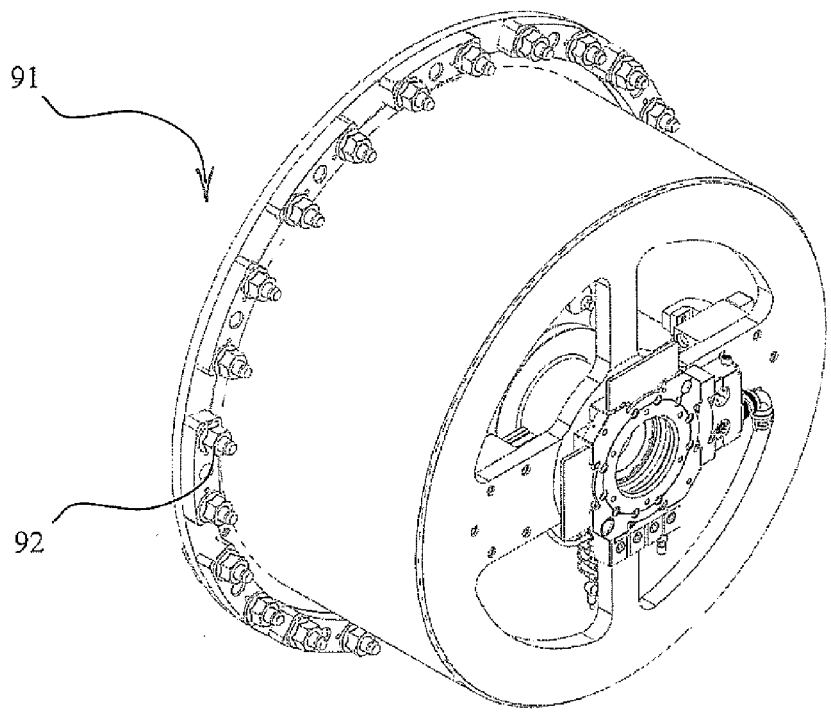
FIG. 9 illustrates a nut nest for use during rear wheel removal.
Figure 10:
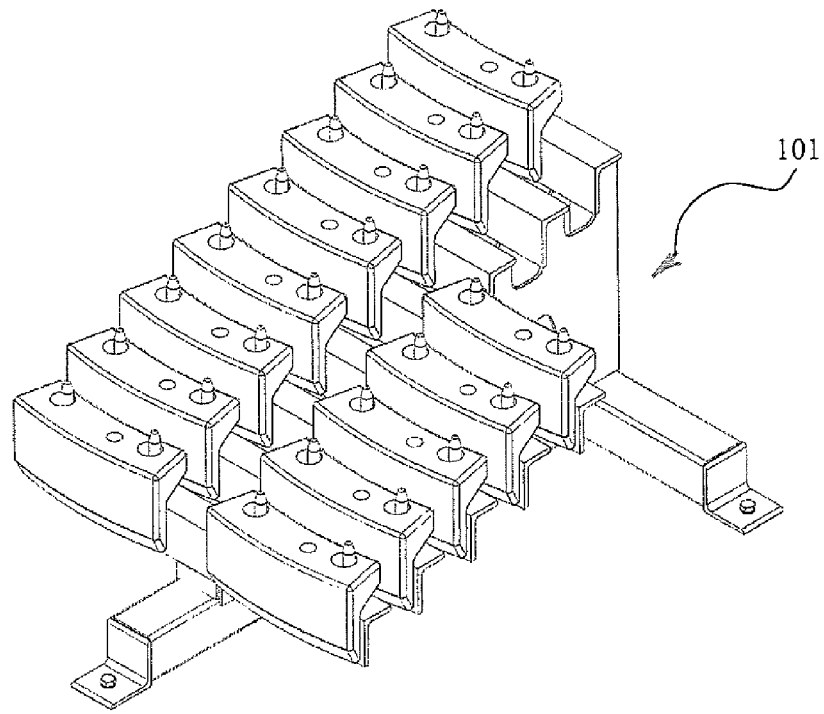
FIG. 10 illustrates a cleat nest for rear wheel cleats.
Figure 11:
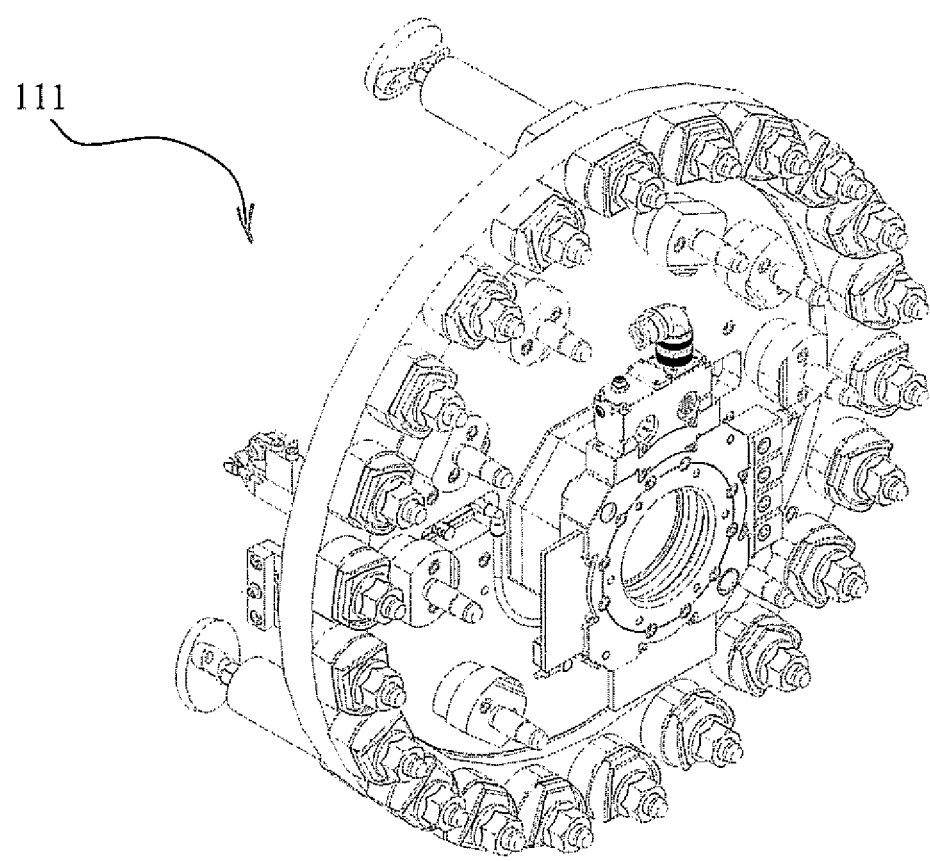
FIG. 11 illustrates a front wheel nut and cleat nest.

As illustrated in FIG. 4 the vehicle 42 has a tool location nest 49 for location of the nutrunner when not in use. FIG. 4 also shows a rear wheel nut and cleat nest pallet 50 attachable to the robot vehicle and holding nut and cleat nests 91, 101 as illustrated in FIGS. 9 and 10. For front wheel changing, the pallet 50 is taken away and replaced by a front wheel change pallet fitted with a combined front wheel cleat and nut nest 111 as illustrated in FIG. 11. The functions of the front and rear wheel nut and cleat nests will become clear in the description of the robot functions with reference to FIGS. 12 to 63.

Figure 5:
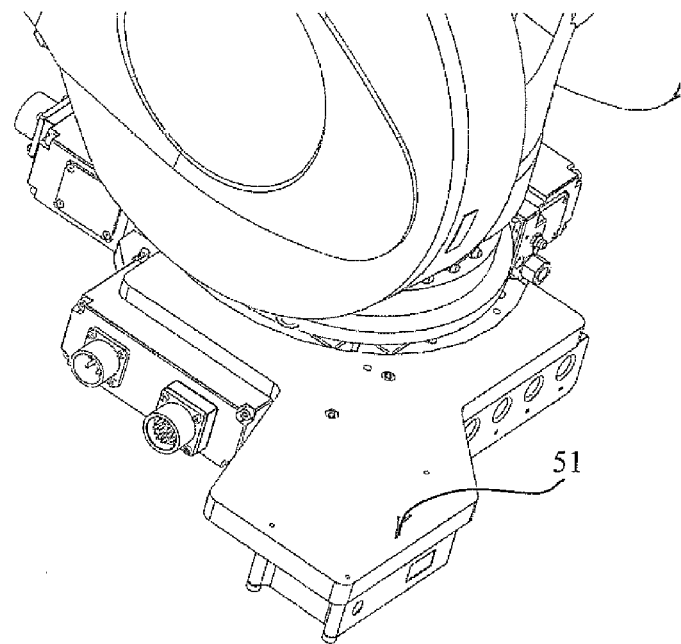
FIG. 5 illustrates a laser scanning tool of the apparatus.

Laser scanning tool 51 as illustrated in FIG. 5 is in the form of a laser distance measuring device to determine robot position and to adjust predetermined movements accordingly. A laser distance measurement system has a number of advantages over a vision system such as lower cost, no output variants due to lighting conditions, no output variants due to colour variations, less output variants due to dust, mist etc. It requires no external lighting and is simpler to maintain than a vision system. If the wheel type is selected for the robot the position of the plane of the wheel rim at its central axis can be determined by scanning across the outer surfaces of the rim and tyre in two lines at right angles to each other. The robot controller can then calculate the position of the nut Pitch Circle Diameter (PCD). A third scan around the nuts or studs will determine the angular orientation of the cleats and the position of the valve stem. It will also confirm the correct selection of wheel type.

After determining the plane and axis of the rim at angular orientation of the cleats and valve stem, the robot controller can adjust the future robot motions accordingly.

The laser measurement device can also be used to determine if the wheel handler is present and if the robot can safely manoeuvre under its arms. This is achieved by performing a pre-scan of the area immediately in front of the wheel prior to the robot beginning the wheel scan. In so doing the robot can protect itself from a possible collision due to inadvertent activation in a dangerous orientation.

FIG. 6 illustrates a two speed nut runner 61 for removing and refitting rear wheel nuts. It comprises a nut engaging socket 62 mounted on a spindle extension 63 which can be selectively driven at two speeds via a spindle 64, a three way gear box 65, a high torque nut runner 66 and high torque clutch 67 or alternatively from a high speed nut runner 68 and clutch 69.

FIG. 7 illustrates a wheel cleat gripper for removing and replacing rear wheel cleats. When the wheel nuts have been removed the cleats will be relatively free to be removed but may be locked in position by their taper and the weight of the wheel. Tool 71 is capable of applying a strong gripping action and to pull a cleat from its location without the need for jacking. Tool 71 is effectively a special purpose pair of pliers having gripper jaws 72, pneumatically actuated through a toggle linkage 73. The body of the tool incorporates forwardly projecting prelocators 74 to locate on the cleats and the jaws 72 close to grip the sides of the cleats.

The arrangement of the front wheel cleats with a single stud per cleat allows cleat removal with the nuts. Accordingly the tool 61 illustrated in FIG. 6 incorporates a cleat gripper 70 mounted on a nut runner so that the cleat is held in the correct orientation both during nut removal and during tightening. As in the case of the rear wheel tool, the nut runner is a two speed nut runner but has a shorter nut runner spindle.

FIG. 8 illustrates a combined spacer ring gripper and wheel hub cleaning tool 81 incorporating pneumatically operating gripper jaws 82 and polishing head 83 with a rotary scouring pad 84.

Since the robot must pick up nuts to reinstall them during wheel installation the nuts must be stored in known positions. Moreover when the robot removes a nut during wheel removal it will have to carry the nut and deposit it in a position where it will not obstruct other actions rather than simply dropping it. To achieve these two aims the nut runner socket contains one or more spring loaded detents to retain a nut when it is undone and a nest with short studs is used to locate the nuts and remove them from the nut runner socket. Positioning these short studs close to the wheel studs limits the distance that the robot has to travel to deposit the nuts and hence reduces cycle time. This is achieved by employing a different nut nest for each wheel type to be positioned on the hub. The rear wheel nut nest 91 as illustrated in FIG. 9 has a ring of short studs 92 to be positioned close to the wheel studs. This nest is stored and carried on the rear wheel tooling pallet and placed by the robot onto the hub before nut removal. Similarly a nest 101 is provided for the cleats which allows them to be placed by the robot is known positions for later retrieval. This nest is illustrated in FIG. 10 and is shown nesting a set of wheel cleats. The cleat nest is also located on the rear wheel tooling pallet.

The single nut per cleat arrangement for the front wheels of the haul truck allows a cleat and nut nest to be combined into a single nest as illustrated in FIG. 11.

The sequence of operations carried out by the illustrated robotic apparatus for removal and replacement of both rear wheels and front wheels of a haul truck will now be described with reference to FIGS. 12 to 51.

Removal of Rear Wheels

The removal of a pair of rear wheels from a truck involves the following sequence of activities.

1. The truck is driven onto a hard standing pad to a marked location, braked, chocked, locked out, and the rear wheels jacked off the surface using the existing techniques and equipment. The operator inspects the area near the rear wheels and removes any gravel or dirt clods etc.
2. The MBU is driven to the marked location near the rear wheels by the operator using the remote control device and the wheels are lifted lowering the MBU to the ground.
3. The MBU is set-up by the operator to suit the haul truck rear wheels with the rear wheel extension on the nutrunner tool and the rear wheel nut and cleat nest totally attached to the MBU vehicle.
4. The brake dust cover is removed by the operator.
5. The operator connects the air exhaust to the tyre valve and the pressure in both tyres will begin to be reduced towards 5 psi. Note: The haul truck wheel changer machine may begin before the tyre is at a safe pressure thus saving time.
6. The operator will then initiate the automatic process which will include:
    a. The boom will extend to move the robot towards the wheel (FIG. 12).
    b. The robot checks that the path to the wheel is not blocked by any obstacles, e.g. a wheel handler.
    c. The robot conducts a laser distance scan sequence of the wheel which includes a horizontal and vertical scan to identify the plane and centre of the wheel rim and a semi-circular scan over the wheel studs to determine the angular orientation of the nuts (FIG. 14).
    d. The robot boom retracts and the robot picks up the nut nest before the boom extends again where the robot will place the nest over the hub (FIGS. 15 and 16).
    e. The robot boom again retracts and a light is illuminated to indicate the completion of the automatic cycle ready for the wheel handler to arrive to grip the wheel (FIG. 16). Note: the wheel handler can be brought in later as the robotic apparatus could begin loosening nuts without the wheel handler present.
7. When the wheel handler has gripped the wheel, the operator will initiate the second automatic cycle. This cycle includes
    a. The robot picks up the nutrunner tool and the boom extends to present the robot to the wheel (FIGS. 17 and 18).
    b. The robot progressively loosens and removes the nuts, and screws them onto the adjacent stud on the nut nest (FIGS. 19 to 21).
    c. The robot boom retracts and the robot picks up the cleat removal tool before the boom extends again (FIG. 22).
    e. The robot progressively grips and removes the cleats and places them into the cleat nest retracting and extending the boom as required to access the nest. If a cleat is particularly difficult to remove, the robot's light will illuminate to request the wheel handler driver to "jiggle" the wheel until the cleat is freed (FIG. 22).
    f. When the last cleat is removed, the boom retracts and the robot deposits the cleat gripper tool. (FIG. 24).

8. The MBU then signals "All Clear" to the wheel handler driver with an illuminated light and the driver proceeds to remove the wheel (FIG. 25).
9. When the outer wheel has been removed, the operator initiates the third automatic cycle.
   a. The robot picks up the spacer ring gripper tool and the boom will extend to present the robot to the wheel (FIG. 26).
   b. The robot uses the spacer ring gripper to grab the wheel spacer ring and slide it off the hub (FIG. 27).
   c. The boom retracts and the robot places the ring in the ring cradle on the rear wheel pallet (FIG. 28).
   d. The MBU will then signal "All Clear" to the wheel handler driver.
10. The wheel handler driver then approaches, grips and removes the inner wheel.
11. When the inner wheel has been removed, the operator initiates the fourth automatic cycle.
    a. The robot picks up the air operated buffing tool (FIG. 29).
    b. The boom extends to present the robot to the hub.
    c. The robot fully buffs the taper and the cleat areas of the hub. (FIG. 30).
    d. The boom retracts, the robot puts down the buffing tool and the MBU signals "All Clear" to the operators.

Fitment of Rear Wheels

Re-fitment of the rear wheels is essentially the reverse of the wheel removal. An abbreviated description of the process is as follows.
1. The wheel handler places the inner wheel onto the hub (FIG. 31).
2. The robot places the spacer ring onto the hub (FIG. 32).
3. The wheel handler places and holds the outer wheel onto the hub and the robot returns the spacer ring gripper (FIG. 33).
4. The robot collects the cleat tool and progressively inserts the cleats. If a cleat cannot be pushed to the required position, an illuminated light will alert the wheel handler driver to "jiggle" the wheel (FIGS. 34 and 35).
5. The robot returns the cleat tool. (FIG. 36)
6. The robot collects the nutrunner tool and returns the nuts and progressively torques them to the required torque in an ordered pattern (FIGS. 37 to 40).
7. The robot returns the nut nests to the MBU and signals "All Clear" (FIGS. 41 and 42).
8. The wheel handler can then release the wheel and the operator can re-pressurise the two tyres.
9. The MBU can be driven away by the operator.
10. The truck can be lowered, the chocks removed and the truck driven off the hard standing pad.

Front Wheel Removal and Fitment

The removal of a front wheel from a truck involves a sequence of activities similar to removal of a single rear wheel as follows.
1. The truck is parked, locked out, jacked up and the tyre deflated.
2. The MBU is set-up for a front wheel change, driven to the wheel and the safety system set-up (FIGS. 43 and 44).
3. The robot scans the wheel to locate the plane, center and orientation of the nuts and the gap in the valve stem location.
4. The robot places the nut and cleat nest on the wheel hub (FIGS. 45 and 46).
5. The wheel handler will grip the tyre
6. The robot removes the nuts and cleats together and places them on the nest (FIGS. 47 to 51).
7. The wheel handler will remove the wheel
8. The robot will clean the hub
9. The wheel handler will place and hold a new wheel
10. The robot will place the cleats and nuts, torque them up and remove the nut and cleat nest.
11. The MBU can be driven away by the operator.
12. The wheel handler will leave, the tyre can be inflated and the truck can be lowered and driven away.

The use of the illustrated machine enables major reductions to the exposure of maintenance personnel to health and safety hazards during wheel changing. These reductions include:—

The time that an operator is required to be working in the area between the wheel and the wheel handler (the explosion and crush zone) is reduced from in excess of 1 hour to less than 5 minutes. All functions in this zone associated with manual operations on nuts, cleats and the rear wheel spacer ring are eliminated.

The operator's exposure to cuts, sprains and bruising associated with handling nuts, cleats and hand tools is eliminated.

The operator's use of the pneumatic impact driver and its associated potential to trigger VWF, a secondary form of Raynaud's disease is eliminated.

The illustrated machine also enables the quality of wheel nut tightening to be vastly improved providing much greater assurance of correct tightening and correct wheel attachment. The issues associated with this include:—

All nuts are consistently tightened to the required torque and with a consistent tightening pattern. The nuts may also be tightened to a designated angle within torque limits. The data recording function of the control system provides documented proof of the torque achieved on each nut. At present the torque achieved is unknown, different for each nut and potentially below the specified torque.

All torques and torque/distance profiles can be documented and recorded in a database.

A variety of unwanted conditions such as thread damage can be recognised from the torque and angle profiles generated in nut installation that currently go unnoticed.

The illustrated apparatus has been advanced by way of example only and the constructional details may be modified for differing specific applications. The invention is not limited to wheel changing operations and may be applied to performing other repetitive tasks such as re-torquing wheel nuts of wheel loaders or removing/installing nuts or other fasteners on a variety of heavy equipment. It is therefore to be understood that the invention is not limited to the detail of the illustrated apparatus and that many modifications and variations will fall within the scope of the appended exemplary claims.

The invention claimed is:

1. A method for changing a vehicle wheel held to a vehicle by wheel nuts and retainer cleats comprising:
   using a mobile robot for removal and replacement of the wheel nuts and retainer cleats in combination with a mobile mechanical wheel handler to grip and remove the wheel and to bring a replacement wheel into position before replacement of the wheel nuts and cleats by the robot.

2. A method as claimed in claim 1 wherein the wheel handler is an operator driven vehicle fitted with wheel gripper jaws.

3. A method as claimed in claim 1, further comprising the step of laser scanning the wheel to identify positions of the wheel nuts and retainer cleats and controlling operation of the robot in accordance with the positions so determined.

4. A method as claimed in claim 3 wherein the robot moves nut and cleat removal tools sequentially to the determined positions of the nuts and cleats and manipulates those tools for removal and replacement of the nuts and cleats.

5. A method as claimed in claim 1 wherein on removal each nut and cleat is deposited by the robot at an individual storage location unique to that nut or cleat and for replacement each nut and cleat is retrieved by the robot from the respective storage location.

6. A method for changing a vehicle wheel held to the vehicle by wheel nuts and retainer cleats, comprising:
    laser scanning the vehicle wheel to identify positions of the wheel nuts and retainer cleats;
    operating a mobile robot to remove the wheel nuts and retainer cleats;
    operating a mechanical wheel handler to remove the vehicle wheel and to replace the vehicle wheel with a replacement wheel; and
    operating the mobile robot to replace the wheel retainer cleats and the nuts.

7. A method as claimed in claim 6 wherein the laser scanning is performed by the mobile robot operating to manipulate a laser scanner tool.

8. A method as claimed in claim 7 wherein the mobile robot removes the wheel nuts and retainer cleats by manipulation of one or more removal tools in accordance with the positions of the nuts and cleats determined by the laser scanning.

9. A method as claimed in claim 8 wherein the one or more removal tools comprise a nut runner for operation in the removal and replacement of the wheel nuts and a cleat gripper to grip retainer cleats for removal and replacement of the retainer cleats.

10. A method as claimed in claim 9 wherein the nut runner and the cleat gripper are incorporated into a single removal tool.

11. The method as claimed in claim 9, wherein the nut runner has a nut engagement head and a multiple speed head driver to rotate the head at differing speeds and torques.

12. The method as claimed in claim 11, wherein the multiple speed head driver comprises a drive spindle connected to the nut engagement head and high and low speed drive motors selectively coupleable to the spindle.

13. A method as claimed in claim 8 wherein on removal each wheel nut and retainer cleat is deposited by operation of the robot and respective removal tool at an individual storage location unique to that wheel nut or retainer cleat and for replacement each wheel nut and retainer cleat is retrieved by the robot from the individual storage location.

14. A method as claimed in claim 13 wherein the individual storage locations for the wheel nuts and retainer cleats are provided by one or more storage nests.

15. A method as claimed in claim 14 wherein the individual storage locations for the wheel nuts are provided by a nut nest placed on a wheel hub by the robot prior to removal of the wheel nuts and retainer cleats.

16. A method as claimed in claim 15 wherein the nut nest remains on the wheel hub during removal of the vehicle wheel and replacement by a replacement wheel by operation of a wheel handler.

17. A method as claimed in claim 14 wherein the individual storage locations for the retainer cleats are provided by a cleat nest positioned by the robot adjacent the vehicle wheel, and wherein the cleat nest is positioned by the robot after the wheel nuts have been removed and placed on a nut nest.

18. A method as claimed in claim 14 wherein the individual storage locations for the wheel nuts and retainer cleats are provided by a combined nut and cleat storage nest placed on a wheel hub by the robot prior to removal of the nuts and cleats, and wherein the nut and cleat storage nest remains on the wheel hub during removal of the vehicle wheel and replacement with a replacement wheel by operation of a wheel handler.

19. The method as claimed in claim 6, wherein the step of laser scanning the vehicle wheel is performed by a location sensing system for detecting locations of the wheel nuts and/or retainer cleats on the vehicle wheel, the location sensing system comprising;
    a laser distance measuring device; and
    a manipulator to move the laser distance measuring device in a two way scan to identify a plane of a wheel rim and an arcuate scan to identify angular orientations of the nuts and/or cleats.

20. The method as claimed in claim 19, wherein said manipulator is operable by the robot also operable to perform wheel nut and/or retainer cleat removal and replacement activities to facilitate a wheel change, and wherein the robot has a control unit to receive signals from the laser distance measuring device indicative of the locations of the wheel nuts and/or retainer cleats and subsequently to control the robot to perform the wheel nut and/or retainer cleat removal and replacement activities.

* * * * *